United States Patent
Turner et al.

(10) Patent No.: US 9,626,687 B2
(45) Date of Patent: *Apr. 18, 2017

(54) SYSTEMS AND METHODS OF GENERATING AND USING A BITMAP INDEX

(71) Applicant: Umbel Corporation, Austin, TX (US)

(72) Inventors: Travis Turner, Austin, TX (US); Todd Gruben, Cedar Park, TX (US); Higinio O. Maycotte, Austin, TX (US); Cody Soyland, Austin, TX (US)

(73) Assignee: UMBEL CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,477

(22) Filed: Aug. 8, 2016

(65) Prior Publication Data
US 2016/0350775 A1 Dec. 1, 2016

Related U.S. Application Data

(63) Continuation of application No. 14/757,800, filed on Dec. 23, 2015, now Pat. No. 9,436,718, which is a continuation of application No. 14/165,200, filed on Jan. 27, 2014, now Pat. No. 9,280,780.

(51) Int. Cl.
*G06F 17/30* (2006.01)
*G06Q 30/02* (2012.01)

(52) U.S. Cl.
CPC ... *G06Q 30/0204* (2013.01); *G06F 17/30324* (2013.01); *G06F 17/30463* (2013.01); *G06F 17/30477* (2013.01)

(58) Field of Classification Search
CPC ......... G06F 17/30324; G06F 17/30436; G06F 17/30477
See application file for complete search history.

(56) References Cited

U.S. PATENT DOCUMENTS

| | | | |
|---|---|---|---|
| 5,907,297 A | 5/1999 | Cohen et al. | |
| 6,341,281 B1 | 1/2002 | Macnicol | |
| 6,421,662 B1 * | 7/2002 | Karten | G06F 17/30324 |
| 7,478,109 B1 * | 1/2009 | Panigrahy | G06F 7/02 |
| 7,689,630 B1 * | 3/2010 | Lam | G06F 17/30324 |
| | | | 707/802 |

(Continued)

OTHER PUBLICATIONS

Wu, et al., "FastBit: Interactively Searching Massive Data", 2009, retrieved on Arp. 28, 2014 via Internet: http://opscience.iop.org/1742-6596/180/1/012053, 10 pp.

(Continued)

*Primary Examiner* — Noosha Arjomandi
(74) *Attorney, Agent, or Firm* — Toler Law Group, P.C.

(57) ABSTRACT

Systems and methods of generating and using a bitmap index are disclosed. The bitmap index stores bit strings. In a particular implementation, each bit string in the bitmap index corresponds to an attribute of an audience. Each location in each bit string corresponds to the same audience member. The bitmap index supports parallelized and distributed execution of queries with respect to data indexed by the bitmap index. For example, the described bitmap index can be used to index advertising data, healthcare data, financial data, etc.

20 Claims, 18 Drawing Sheets

(56) References Cited

U.S. PATENT DOCUMENTS

| | | | | |
|---|---|---|---|---|
| 8,074,206 | B2* | 12/2011 | Sauermann | G06F 11/3612 |
| | | | | 717/130 |
| 8,214,390 | B2 | 7/2012 | Watfa | |
| 8,255,386 | B1 | 8/2012 | Annau et al. | |
| 9,489,410 | B1* | 11/2016 | Turner | G06F 17/30324 |
| 2002/0133491 | A1* | 9/2002 | Sim | G06F 17/30067 |
| 2003/0061227 | A1 | 3/2003 | Baskins | |
| 2003/0154189 | A1 | 8/2003 | Egilsson | |
| 2004/0230583 | A1* | 11/2004 | Testa | H04L 45/00 |
| 2004/0249782 | A1 | 12/2004 | Ricci | |
| 2004/0254909 | A1* | 12/2004 | Testa | H04L 45/00 |
| 2007/0112794 | A1* | 5/2007 | McRae | H04L 47/10 |
| 2008/0270374 | A1 | 10/2008 | Li | |
| 2009/0037492 | A1 | 2/2009 | Baitalmal et al. | |
| 2010/0106605 | A1 | 4/2010 | Lin et al. | |
| 2010/0114973 | A1* | 5/2010 | Goyal | G06F 17/30985 |
| | | | | 707/802 |
| 2010/0241654 | A1* | 9/2010 | Wu | G06F 17/30233 |
| | | | | 707/769 |
| 2011/0317587 | A1* | 12/2011 | Lida | H04L 12/2832 |
| | | | | 370/254 |
| 2012/0209873 | A1 | 8/2012 | He | |
| 2012/0254144 | A1 | 10/2012 | Borkovsky et al. | |
| 2013/0086017 | A1 | 4/2013 | Chao et al. | |
| 2013/0159298 | A1 | 6/2013 | Mason et al. | |
| 2014/0114738 | A1 | 4/2014 | Tseng et al. | |
| 2014/0214880 | A1* | 7/2014 | Chi | G06F 17/30442 |
| | | | | 707/768 |
| 2015/0026153 | A1* | 1/2015 | Gupta | G06F 17/30336 |
| | | | | 707/711 |
| 2015/0142821 | A1* | 5/2015 | Rassen | G06F 17/30619 |
| | | | | 707/742 |
| 2016/0092564 | A1* | 3/2016 | Srivastava | G06Q 30/0625 |
| | | | | 707/722 |

OTHER PUBLICATIONS

"Agile and Scalable", "Agile and Scalable", copyright 2013 MongoDB, Inc., 3 pages, retrieved on Dec. 18, 2013 from http://www.mongodb.org/, 3 pages.

"Amazon Elastic MapReduce (Amazon EMR)", "Amazon Elastic MapReduce (Amazon EMR)", Amazon Web Services, 1 page, retrieved on Dec. 18, 2013 from http://aws.amazon.com/elasticmapreduce/, 1 page.

"Apache Cassandra", "Apache Cassandra", Wikipedia, developed by Lakshman et al., Apache Software Foundation, DataStax, 10 pages, retrieved on Dec. 18, 2013 from http://en.wikipedia.org/wiki/Apache_Cassandra, 10 pages.

"AWS/Amazon Redshift (Beta) Cloud Data Warehouse Solutions", "AWS/Amazon Redshift (Beta) Cloud Data Warehouse Solutions", Amazon Web Services, 1 page, retrieved on Dec. 18, 2013 from http://aws.amazon.com/redshift/, 1 page.

"Bit array", "Bit array", Wikipedia, 7 pages, retrieved on Dec. 18, 2013 from http://en.wikipedia.org/wiki/Bit_array, 7 pages.

"Consistent hashing", "Consistent hashing", Wikipedia, retrieved on Dec. 18, 2013 from http://en.wikipedia.org/wiki/Consistent_hashing, 4 pages.

"Elasticsearch", "Elasticsearch", Wikipedia, developed by Shay Banon, 3 pages, retrieved on Dec. 18, 2013 from http://en.wikipedia.org/wiki/ElasticSearch, 3 pages.

"FastBit: An Efficient Compressed Bitmap Index Technology", "FastBit: An Efficient Compressed Bitmap Index Technology", 3 pages, retrieved on Dec. 18, 2013 from https://sdm.lbl.gov/fastbit/, 3 pages.

"Lucene", "Lucene", Wikipedia, developed by Apache Software Foundation, 3 pages, retrieved on Dec. 18, 2013 from http://en.wikipedia.org/wiki/Lucene, 3 pages.

"MapReduce", "MapReduce", Wikipedia, 12 pages, retrieved on Dec. 18, 2013 from http://en.wikipedia.org/wiki/MapReduce, 12 pages.

"Pivotal Greenplum Database", "Pivotal Greenplum Database", Enable Analytic Innovation, 13 pages, retrieved on Dec. 18, 2013 from http://www.gopivotal.com/products/pivotal-greenplum-database, 13 pages.

"Project-z/mutton, GitHub, The core bitmapping indexing code for project-z", Project-z/mutton, GitHub, The core bitmapping indexing code for project-z, 2013 GitHub, Inc., 2 pages, retrieved on Dec. 18, 2013 from https://github.com/project-z/mutton, 2 pages.

"Riak/Basho", "Riak/Basho", 4 pages, retrieved on Dec. 18, 2013 from http://basho.com/riak/, 4 pages.

"Cassandra Summit 2013: Cassandra on Flash Performance & Efficiency Lesson, slideshare, Planet Cassandra Community, Real-Time Large Querie", Cassandra Summit 2013: Cassandra on Flash Performance & Efficiency Lesson, slideshare, Planet Cassandra Community, Real-Time Large Queries, retrieved on Dec. 18, 2013 from http://www.slideshare.net/planetcassandra/1-matt-stump#, 13 pages.

"EsperTech Event Series Intelligence, Where Complex Event Processing meets Open Source", EsperTech Event Series Intelligence, Where Complex Event Processing meets Open Source; Esper & NEsper, 2 pages, copyright 2006-2013, EsperTech, Inc., retrieved on Dec. 18, 2013 from http://www.espertech.com/, 2 pages.

"Nathanmarz/storm", Nathanmarz/storm, GitHub, last edited by P. Taylor Goetz, Nov. 6, 2013, 2013 GitHub, Inc., 2 pages, retrieved on Dec. 18, 2013 from http://stormproject.net/, 2 pages.

"Open Source Distributed Real Time Search & Analytics/Elasticseach", Open Source Distributed Real Time Search & Analytics/Elasticseach, retrieved on Dec. 18, 2013 from http://www.elasticsearch.org/, 14 pages.

Babcock, et al., "Distributed Top-K Monitoring", "Distributed Top-K Monitoring", Brian Babcock et al., SIGMOD 2003, 24 pages, retrieved on Dec. 18, 2013 from http://infolab.stanford.edu/~olston/publications/topk.pdf, 24 pages.

Bayer, "The Absolutely Simplest Consistent Hashing Example", zzzeek, Mostly Computer Stuff, "The Absolutely Simplest Consistent Hashing Example", Mike Bayer, Jul. 7, 2012; 5 pages, retrieved on Dec. 18, 2013 from http://techspot.zzzeek.org/2012/07/07/the-absolutely-simplest-consistent-hashing-example/, Jul. 7, 2012, 5 pages.

Colantonia, et al., "Concise: Compressed 'n' Composable Integer Set", "Concise: Compressed 'n' Composable Integer Set", A. Colantonio and R. Di Pietro, Universita di Roma Tre, Roma Italy, May 21, 2010, 8 pages, retrieved on Dec. 18, 2013 from http://ricerca.mat.uniroma3.it/users/colanton/docs/concise.pdf, 8 pages.

Dean, J., et al., "MapReduce: Simplified Data Processing on Large Clusters", Dean, J. et al., "MapReduce: Simplified Data Processing on Large Clusters", Google, Inc., OSDI '04: Sixth Symposium on Operating System Design and Implementation, San Francisco, CA, Dec. 2004, 13 pages, Dec. 2004, 13 pages.

Gosink, et al., "Bin-Hash Indexing: A Parallel GPU-Based Method for Fast Query Processing", IDAV, Institute for Data Analysis and Visualization, "Bin-Hash Indexing: A Parallel GPU-Based Method for Fast Query Processing", Luke Gosink et al., Technical Report LBNL-729E, Laurence Berkeley National Laboratories, 2008, 4 pages, retrieved on Dec. 1, 2008, 4 pages.

Ihab F. Iiyas, et al., "A Survey of Top-k Query Processing Techniques in Relational Database Systems", "A Survey of Top-k Query Processing Techniques in Relational Database Systems", Ihab F. Iiyas et al., University of Waterloo, ACM Computing Surveys, vol. 40, No. 4, Article 11, Oct. 2008, 58 pages, retrieved on Dec. 18, 2013 from https://cs.uwaterloo.c, Oct. 2008, 58 pages.

Lemire, "Sorting improves word-aligned bitmap indexes", "Sorting improves word-aligned bitmap indexes", D. Lemire et al., Dec. 5, 2009, Computer Science Databases, Cornell University Library, 43 pages, retrieved on Dec. 18, 2013 from http://arxiv.org/pdf/0901.3751v4, 43 pages.

Stockinger, et al., "Using Bitmap Index for Joint Queries on Structured and Text Data", 2009, 23 pp.

\* cited by examiner

Query: Show me information related to men in my audience that like Coffee Shop A or have made a purchase — 702

Male ∩ (Coffee Shop A ∪ Purchase)

| | 0 | 1 | ... | | | | | ... | S-1 | X*S | | | | ... | | | | Q | Q+1 | |
|---|---|---|---|---|---|---|---|---|---|---|---|---|---|---|---|---|---|---|---|---|
| Male | 0 | 1 | ... | 1 | 0 | 1 | 0 | ... | 0 | 0 | 1 | 0 | 1 | ... | 0 | 1 | 1 | 1 | 1 | 1 |
| Income [100-110k] | 1 | 0 | ... | 0 | 1 | 1 | 0 | ... | 1 | 1 | 0 | 1 | 0 | ... | 1 | 0 | 0 | 0 | 1 | 1 |
| Single | 0 | 1 | ... | 1 | 0 | 1 | 0 | ... | 0 | 0 | 1 | 1 | 1 | ... | 1 | 0 | 1 | 0 | 0 | 1 |
| Coffee Shop A | 0 | 1 | ... | 0 | 1 | 0 | 1 | ... | 0 | 0 | 0 | 1 | 0 | ... | 1 | 1 | 1 | 0 | 0 | 7 |
| Clothing Brand D | 0 | 1 | ... | 1 | 0 | 0 | 0 | ... | 1 | 0 | 1 | 0 | 0 | ... | 0 | 0 | 1 | 0 | 0 | 0 |
| Television Network C | 1 | 0 | ... | 0 | 1 | 1 | 0 | ... | 0 | 1 | 0 | 1 | 1 | ... | 1 | 1 | 0 | 1 | 1 | 1 |
| Watches Video | 1 | 0 | ... | 1 | 0 | 0 | 0 | ... | 1 | 0 | 1 | 0 | 0 | ... | 0 | 1 | 1 | 0 | 0 | 6 |
| Purchase | 0 | 1 | ... | 0 | 1 | 0 | 0 | ... | 0 | 1 | 0 | 1 | 1 | ... | 1 | 1 | 0 | 1 | 0 | 10 |
| Reads Articles | 0 | 1 | ... | 1 | 0 | 1 | 0 | ... | 0 | 0 | 1 | 0 | 1 | ... | 1 | 1 | 1 | 1 | 0 | 1 |
| Filter String | 0 | 1 | | 0 | 1 | 0 | 0 | | 0 | 1 | 0 | 1 | 1 | | 1 | 1 | 0 | 1 | 0 | 1 |

Slice 1 — Slice X

1302
Receive a query directed to a bitmap index, where the bitmap index includes a plurality of bit strings, where a particular location in each of the plurality of bit strings corresponds to a particular user identifier, and where the plurality of bit strings is stored in distributed fashion across a plurality of nodes 1304
Determine a subset of nodes that store at least a portion of a bit string related to the query 1306
Generate a query execution plan for the received query, where the query execution plan identifies one or more set operations, one or more nodes of the subset of nodes to perform each of the one or more set operations, and a particular node to consolidate results of the one or more set operations to generate a result bit string that indicates a result of the query

*FIG. 13*

SYSTEMS AND METHODS OF GENERATING AND USING A BITMAP INDEX

CROSS-REFERENCE TO RELATED APPLICATIONS

The present application is a continuation of and claims priority to commonly-owned U.S. patent application Ser. No. 14/757,800 filed Dec. 23, 2015 and entitled "SYSTEMS AND METHODS OF GENERATING AND USING A BITMAP INDEX," which is a continuation of and claims priority to commonly-owned U.S. patent application Ser. No. 14/165,200 filed Jan. 27, 2014 and entitled "SYSTEMS AND METHODS OF GENERATING AND USING A BITMAP INDEX," the content of which is expressly incorporated by reference herein in its entirety.

BACKGROUND

With the advent of the Internet, and the increasing popularity of Internet-based media content, significant advertising funds are being directed towards online advertising. Because online advertising is delivered to computing devices, various aspects of online advertising can be quantified. For example, statistics can be collected regarding how many people have viewed an online advertisement, clicked on an online advertisement, etc. The increasing prevalence of online advertising has resulted in the creation and storage of large amounts of measurement data. Analyzing such a large data set may be difficult. Large data sets may also be collected and stored in industries other than online advertising, such as the healthcare industry, the financial industry, etc.

SUMMARY

Systems and methods of using a bitmap index are disclosed. The bitmap index may index "big data," such as data related to an advertising audience of a media property (e.g., a website). For example, an audience measurement system may track, on the basis of received event signals, various demographic properties, brand affinities, and behaviors of a media property's audience. The "raw" data collected by the audience measurement system may be stored in a distributed storage network and the bitmap index may include bit strings corresponding to the raw data (or a portion thereof). For example, the bitmap index may include a bit string for the demographic property "Male" and a bit string for the behavior "Reads articles." The same position in each bit string may correspond to the same audience member. For example, if a particular user is assigned a user identifier (ID) of N, then the value of the $N^{th}$ bit of the "Male" bit string indicates whether the particular user is male and the value of the $N^{th}$ bit of the "Reads articles" bit string indicates whether the particular user has read an article on the media property.

The bitmap index may enable real-time or near-real-time computation of various metrics. For example, the question "what are the 50 most popular brands advertised on my website" may be answered by counting the number of ones in the brand affinity bit strings and then returning the 50 brands with the highest counts. More complex questions may also be answered. To illustrate, the question "what are the 50 most popular brands for men in my audience that have either made a purchase on the website or have an affinity for a particular coffee shop" may be answered by performing logical AND and OR operations on the bit strings to identify the audience subset (also referred to herein as a "segment") that satisfies the query (male AND (purchased OR coffee shop)), and then performing a count operation on the brand affinity bit strings using the segment as a filter.

In selected implementations, the described bitmap index may be stored in a distributed fashion across multiple network nodes. Prior to executing a query, the system may formulate a query execution plan that parallelizes execution of the query and reduces or minimizes the amount of data that is transferred between storage nodes.

BRIEF DESCRIPTION OF THE DRAWINGS

FIG. 7 is a diagram to illustrate another particular embodiment of a method of using a bitmap index during execution of a query;

FIG. 13 is a flowchart to illustrate a particular embodiment of a method of using a bitmap index during execution of a query;

DETAILED DESCRIPTION

Figure 1:
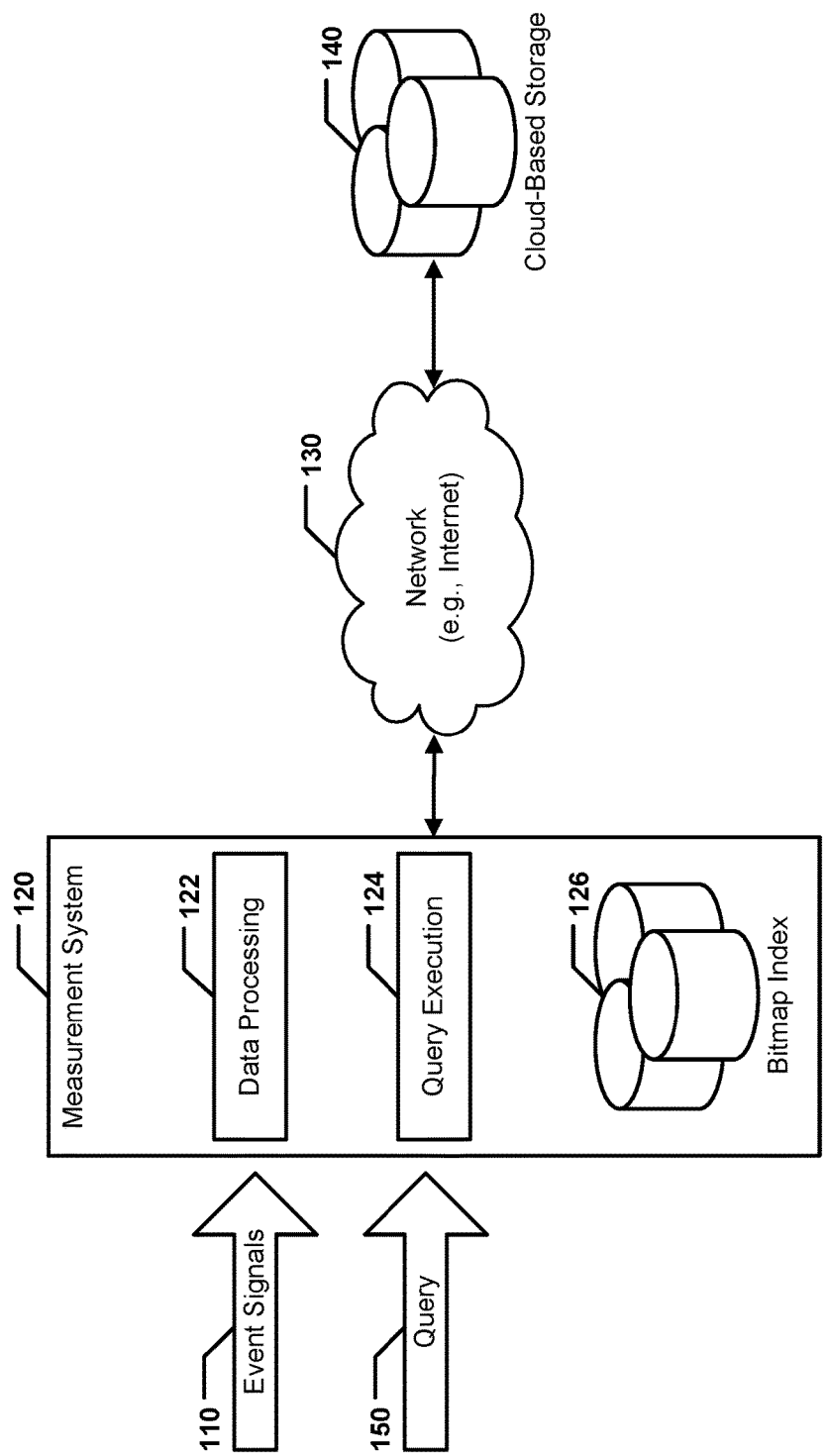
FIG. 1 is a diagram to illustrate a particular embodiment of a system that is operable to generate and use a bitmap index.

FIG. 1 illustrates a particular embodiment of a system 100 that is operable to generate and use a bitmap index. A measurement system 120 may be configured to receive event signals 110 associated with the audience of one or more media properties (e.g., websites). The event signals 110 may be received from sources that include, but are not limited to, computing devices, mobile devices, web servers, measurement logs, third-party data sources, and social networks.

The measurement system 120 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks (LANs) and/or wide area networks (WANs), such as the Internet. In the illustrated example, the measurement system 120 is communicably coupled to a network 130.

The event signals 110 may include information associated with audience members of a media property. For example, when an audience member creates an account or otherwise registers with a media property using social networking identification, the measurement system 120 may retrieve event signals corresponding to data stored in social networking profiles of the audience member. As another example, the event signals 110 may identify specific interactions by the audience members with respect to the media property (e.g., what action was taken at a media property, when the action was taken, for how long the action was taken, etc.). The interactions may include interactions with advertisements presented by the media property and/or interactions with content presented by the media property. In a particular embodiment, each of the event signals 110 identifies a property (e.g., "Property 1") and an audience member (alternately referred to herein as a "user"). For example, if a user having a user ID=N made a purchase on the website for Property 1, a corresponding event signal received by the measurement system 120 may be "(userID=N, property='Property 1', behavior=Purchase)". In alternate embodiments, a different format may be used to represent an event signal.

The measurement system 120 may include a data processing module 122 and a query execution module 124, each of which may be implemented using instructions executable by one or more processors at the measurement system 120. The data processing module 122 may receive the event signals 110 and store "raw" data corresponding to the event signals 110 (e.g., a copy of the event signals 110) in cloud-based storage 140. The data processing module 122 may also store indexing data for the cloud-based storage 140 in a bitmap index 126. In a particular embodiment, unlike the cloud-based storage 140, the bitmap index 126 may be local (or more quickly accessible) to the measurement system 120. To illustrate, data for the bitmap index 126 may be stored across one or more data storage devices (e.g., nodes) that are part of the measurement system 120 or accessible to the measurement system 120 via a LAN, or other private high-speed network, as opposed to a WAN. Thus, read and write operations with respect to the bitmap index 126 may be faster than corresponding read and write operations with respect to the cloud-based storage 140.

The measurement system 120 may maintain a bitmap index 126 for each media property being measured. Data in the bitmap index 126 may be stored in the form of bit strings. The bitmap index 126 may store bit strings corresponding to at least a subset of the data stored in the cloud-based storage 140. In a particular embodiment, the bitmap index 126 for a particular media property includes, for each audience member of the media property, data regarding one or more demographic attributes of the audience member, one or more brand affinities of the audience member, and/or one or more behaviors (e.g., interactions with the media property) of the audience member.

To illustrate, a media property may have a known audience of one hundred thousand registered members. The bitmap index 126 for the media property may include bit strings representing demographics, brand affinities, and behaviors of each of the hundred thousand audience members. Each of the bit strings may be one hundred thousand bits in length. Further, the same location in each bit string may correspond to the same audience member. For example, if the $N^{th}$ location in a "Male" bit string has a value of "1" and the $N^{th}$ location in a "Watches video" bit string has a value of "1," this indicates that the $N^{th}$ audience member (who has a userID=N) is a male that has watched at least one video on the property.

It should be noted that the bitmap index 126 for a media property may store bit strings corresponding to less than all of the data stored in the cloud-based storage 140. For example, although the cloud-based storage 140 may include "raw" data corresponding to brand affinities of millions of brands, the bitmap index 126 may store bit strings for a smaller subset of the most popular brands (e.g., the top fifty thousand brands). An example of the bitmap index 126 is further described with reference to FIG. 2.

The query execution module 124 may be configured to use the bitmap index 126 to execute queries regarding measurement data for a media property. For example, the query execution module 124 may receive a query 150 corresponding to the question "What are the top 50 brand affinities for my audience?" In a particular embodiment, the query 150 may be generated using a query generation interface, as further described with reference to FIG. 11. To resolve the query 150, the query execution module 124 may perform count operations on brand affinity bit strings stored in the bitmap index 126. In a particular embodiment, because the bit strings may be stored across multiple nodes, the query execution module 124 may formulate a query execution plan that parallelizes execution of the query 150 across multiple nodes and minimizes the amount of data that is transferred between nodes during execution of the query 150. By executing the query 150 on bit strings stored in the bitmap index 126 in parallel without retrieving data from the cloud-based storage 140 and by reducing or minimizing data transfers, the query execution module 124 may achieve real-time or near-real-time performance. For example, the query execution module 124 may have a maximum query execution latency less than or equal to one hundred milliseconds. Further examples regarding query execution are described with reference to FIGS. 6-8.

During operation, the measurement system 120 may receive the event signals 110 from various event sources. Each event signal may include a unique identifier, such as a user ID. If the user is a "new" audience member, the user may be assigned a new user ID and a user profile may be created for the user. Data for the user profile may be stored in the cloud-storage 140 and/or the bitmap index 126. In a particular embodiment, data for the user profile may be retrieved from third party data sources, including but not limited to social networks. For example, the data may include demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The cloud-based storage 140 and the bitmap index 126 may be updated as additional event signals 110 are received (e.g., when additional users register with the media property, interact with the media property, etc.).

When the measurement system 120 receives the query 150, the query execution module 124 may execute the query 150 based on a query execution plan that parallelizes execution and reduces/minimizes the amount of bit string data that is transferred between nodes during execution of the query 150. The system 100 of FIG. 1 may thus enable audience measurement and analysis based on data (e.g., event signals) received from various sources. For example, event signals may be generated in response to user interactions with websites, web pages, audio items, video items, games, and/or text associated with various media properties. Further, the system 100 of FIG. 1 may enable real-time or near-real time execution of queries on the collected data. For example, the query execution module 124 may execute complex "top N" queries using the bitmap index 126 in real-time or near-real-time (e.g., within one hundred milliseconds).

It should be noted that although various embodiments are described herein in the context of advertising, this is for illustration only and not to be considered limiting. In alternate embodiments, the described bitmap index may be used in other contexts. For example, a tracked "audience" may correspond to patients and the event signals 110 may identify a patient and may correspond to a healthcare event (e.g., a visit to a doctor's office, a prescription being filled, etc.). Bit strings of the bitmap index 126 may correspond to medical attributes, such as medical history, allergy information, medication taken, etc. The same location in each bit string may correspond to the same patient. As another example, a tracked "audience" may correspond to inventory or customers of a store. Bit strings of the bitmap index 126 may correspond to attributes of inventory, such as color, price, demand, etc., and/or attributes of customers. The same location in each bit string may correspond to the same inventory item or the same customer. As yet another example, in the financial industry, the same location in each bit string may correspond to the same investor, the same financial advisor, the same financial product, etc.

Figure 2:
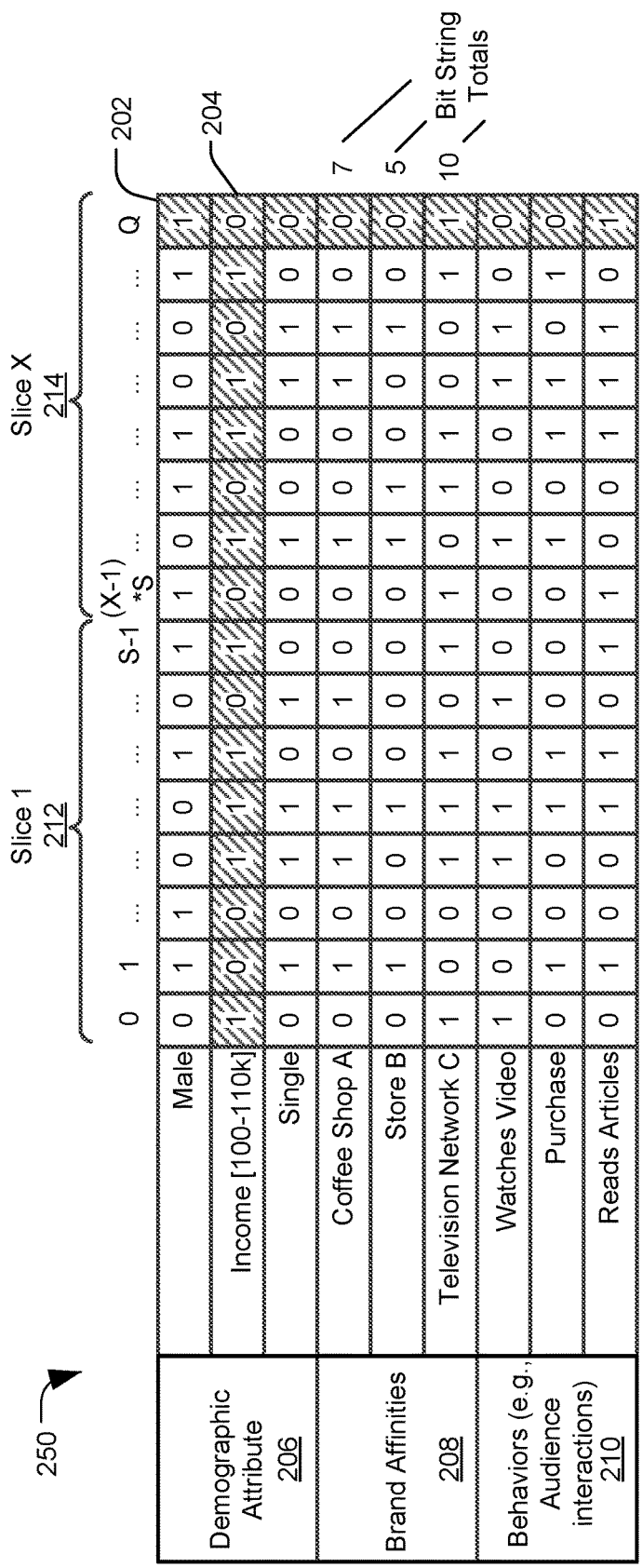
FIG. 2 is a diagram to illustrate a particular embodiment of the bitmap index of FIG. 1.

Referring to FIG. 2, a particular embodiment of a bitmap index 250 is shown. In an illustrative embodiment, the bitmap index 250 is the bitmap index 126 of FIG. 1. The bitmap index 250 may correspond to a particular media property tracked by the measurement system 120 of FIG. 1. The bitmap index 250 stores a plurality of bit strings, where each bit string represents a demographic attribute 206, a brand affinity 208, or a behavior 210 associated with the audience of the media property. For purposes of illustration, the bitmap index 250 is shown as a grid, where each row 204 of the bitmap index 250 corresponds to a bit string. In FIG. 2, a bit string count is shown for the brand affinity bit strings. For example, the bit string for "Coffee Shop A" has a total of 7, indicating that 7 audience members have a brand affinity for "Coffee Shop A."

As described with reference to FIG. 1, the same location in each bit string may correspond to the same audience member (e.g., user ID). Thus, each column 202 of the bitmap index 250 corresponds to a particular audience member. For example, a zero (0) at the intersection of the row 204 and the column 202 indicates that the user having a user ID equal to "Q" does not have an income in the range of $100,000-$110,000. It should be noted that the specific demographic attributes 206, brand affinities 208, and behaviors 208 are for example only. Bit strings may be stored with various other demographic attributes, brands, and behaviors/interactions.

In a particular embodiment, each bit string in the bitmap index 250 is subdivided into "slices" (e.g., sub-strings). In the illustrated example, each slice includes S bits, where S is a positive integer. Thus, a first slice 212 of each bit string includes data related to audience members having IDs 0 to S−1. A last (e.g., $X^{th}$) slice 214 includes data related to audience members having IDs (X−1)*S to Q. When bit strings are subdivided into slices, different slices of the same bit string may be stored in different locations (e.g., storage nodes). A hashing algorithm, such as consistent hashing, may be used (e.g., during read operations, write operations, query execution, etc.) to identify locations of the slices of a bit string. The value of S, which represents the maximum length of each slice, may be set based on a desired query execution latency. In a particular embodiment, S is equal to 65,535 (e.g., each slice includes $2^{16}$ bits).

In a particular embodiment, the bitmap index 250 stores brand affinity bit strings for fewer brands than the total number of brands tracked by a measurement system (e.g., the measurement system 120 of FIG. 1). For example, the measurement system 120 may track millions of brands, but the bitmap index 250 may store bit strings for the N (e.g., fifty thousand) most popular brands. As additional event signals are received, the bitmap index 250 may be updated to replace a bit string for one brand with a bit string for another brand, as further described with reference to FIG. 5.

Figure 3:
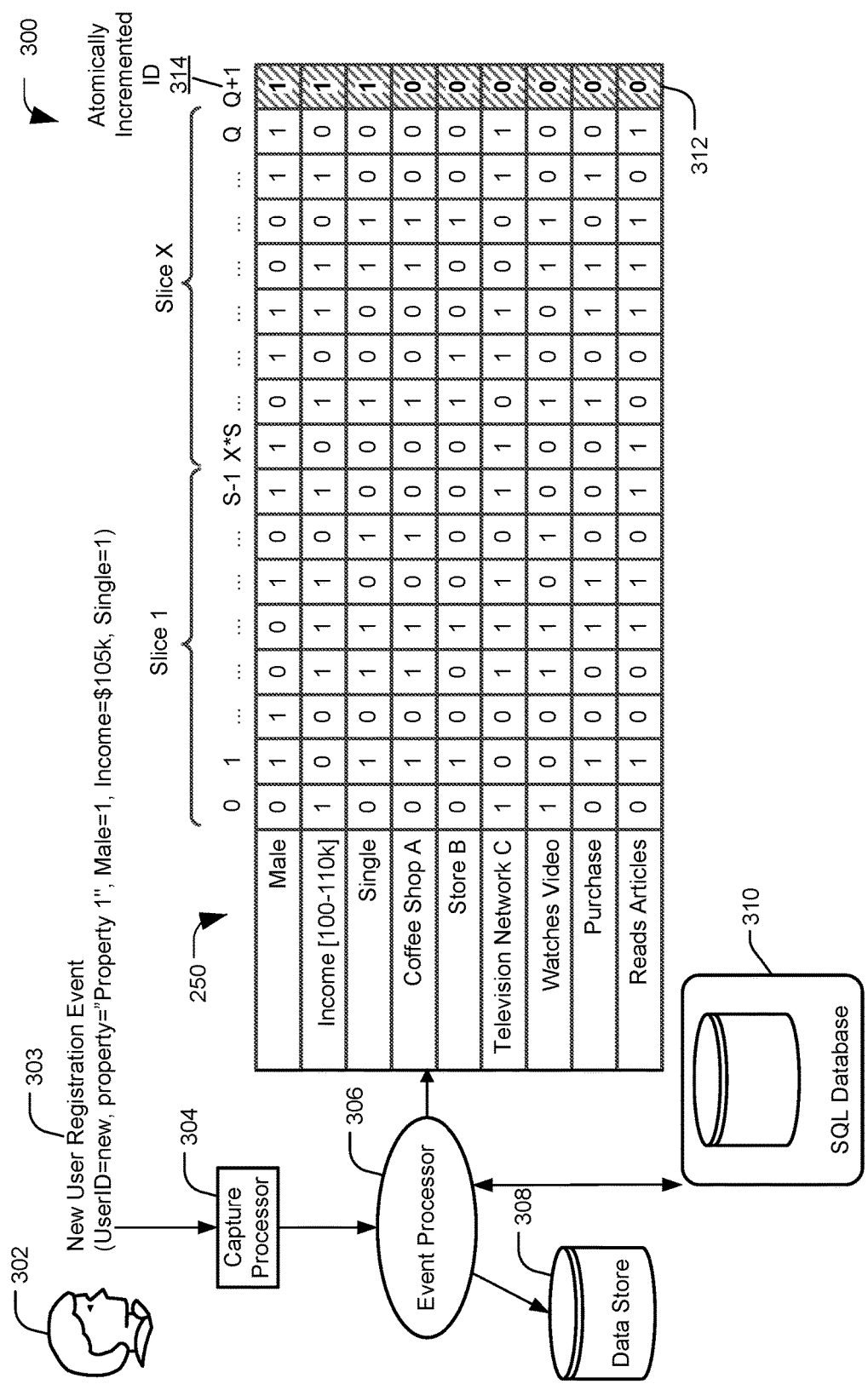
FIG. 3 is a diagram to illustrate a particular embodiment of a method of adding a user to a bitmap index.

Various operations may be performed using the bitmap index 250. For example, FIG. 3 illustrates an embodiment of adding a new user 302 to the bitmap index 250 and is generally designated 300. In a particular embodiment, adding the new user 302 to the bitmap index 250 may involve a capture processor 304, an event processor 306, a data store 308, and a database (e.g., an illustrative structured query language (SQL) database 310). In an illustrative embodiment, the capture processor 304 and the event processor 306 correspond to the data processing module 122 of FIG. 1. The data store 308 and/or the SQL database 310 may correspond to the cloud-based storage 140 of FIG. 1.

During operation, the capture processor 304 may receive an event signal corresponding to a new user registration event 303 for the user 302. The event signal indicates that the user 302 is to be assigned a new user ID and is a new user for the media property "Property 1." The event signal also indicates (e.g., on the basis of retrieved social networking data and/or third-party data) that the user 302 is a male, has an income of $105,000, and is single. In alternate embodiments, such demographic information may be automatically retrieved by a measurement system after the new user registration event, as further described with reference to FIG. 15.

The capture processor 304 (which may implement a capture application programming interface (API)) may send the event signal to the event processor 306. Because the user 302 is a new audience member, the event processor 306 may generate and assign a new user ID to the user 302. For example, the event processor 306 may atomically increment a largest previously assigned user ID (e.g., Q) to generate a new user ID 314 (e.g., Q+1). In a particular embodiment, the event processor 306 requests the new user ID 314 from an atomic incrementer service (e.g., a web service). The event processor 306 may then store data corresponding to the event signal in the data store 308, the SQL database 310, and/or the bitmap index 250. For example, a new column 312 may be created in the bitmap index by storing a new $(Q+1)^{th}$ bit in each of the bit strings in the bitmap index. When allocating and storing data in the $(Q+1)^{th}$ column involves creating a new slice, the event processor 306 may automatically generate a new slice for each bit string of the bitmap index 250. The value of the $(Q+1)^{th}$ bit in the "Male," "Income [100-110 k]," and "Single" bit strings may be set to "1" based on the event signal. The value of the $(Q+1)^{th}$ bit in the remaining bit strings may be zero (e.g., a default value).

Figure 4:
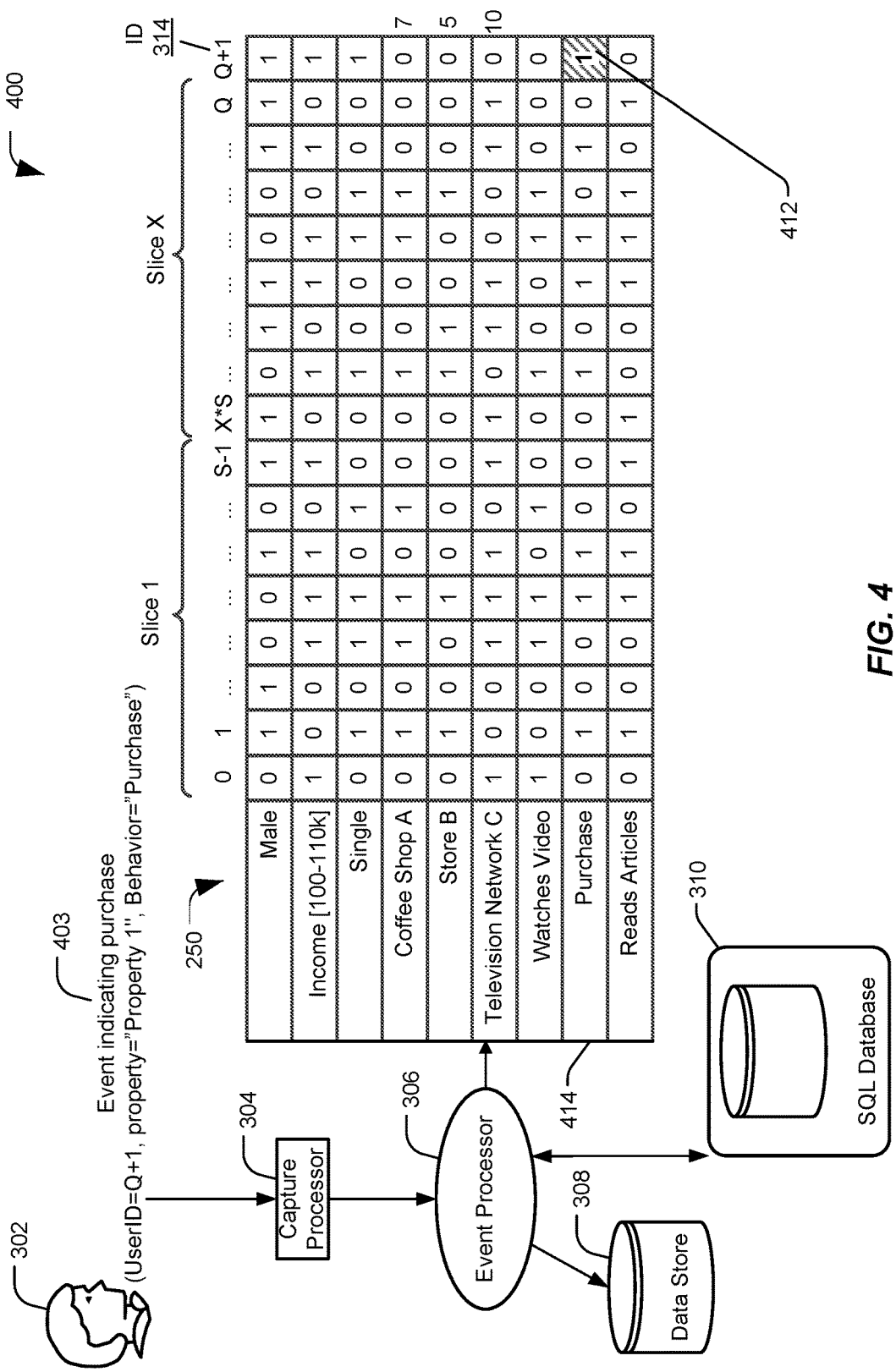
FIG. 4 is a diagram to illustrate a particular embodiment of a method of updating a bitmap index.

FIG. 4 illustrates a particular embodiment of updating the bitmap index 250 and is generally designated 400. During operation, the capture processor 304 may receive an event signal 403 corresponding to updated information for the user 302. In the illustrated example, the event signal 403 is generated based on the user 302 making a purchase on the media property. The event processor 306 may receive the event signal 403 and determines which row(s) and column(s) of the bitmap index 250 are affected by the event signal 403. In the illustrated example, the event processor 306 determines that the event signal 403 will cause the value of the $(Q+1)^{th}$ bit 412 of a "Purchase" bit string 414 to be set to "1." The event processor 306 may also update the data store 308 and/or the SQL database 310 based on the received event signal 403.

Figure 5:
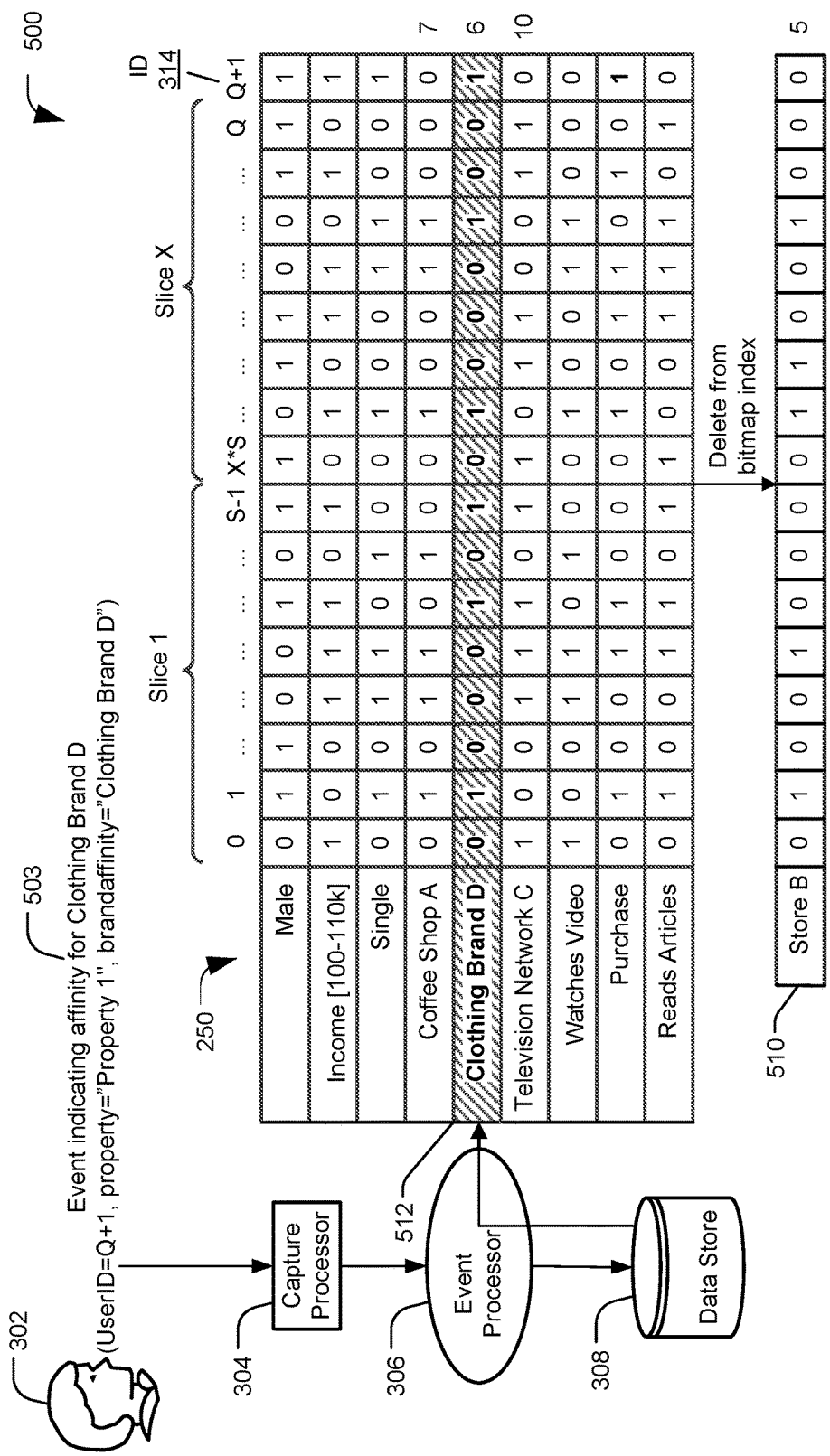
FIG. 5 is a diagram to illustrate another particular embodiment of a method of updating a bitmap index.

Although FIG. 4 illustrates updating the bitmap index 250 in response to receiving an event signal for a user behavior, the bitmap index 250 may similarly be updated in response to receiving an event signal for a demographic attribute or a brand affinity. In the case of brand affinities, additional operations may also be performed. In particular, because the bitmap index 250 stores brand affinity bit strings for the top N (e.g., fifty thousand) brands, receiving a brand affinity event signal may cause a particular brand to become elevated into or fall out of the top N brands. FIG. 5 illustrates a particular embodiment of updating the bitmap index 250 responsive to a brand affinity event signal, and is generally designated 500.

For ease of illustration, the bitmap index 250 is depicted as storing three brand affinity bit strings (i.e., N=3). Initially, the three brands may be "Coffee Shop A," "Store B," and "Television Network C." The brand affinity counts for the three brands are 7, 5, and 10 audience members, respectively. Brand affinity data for additional brands (e.g., brands outside the top N brands) may be stored in the data store 308.

A received event signal 503 may indicate that the user 302 has an affinity for "Clothing brand D." Upon receiving the event signal 503, the event processor 306 may determine that a brand affinity bit string for "Clothing Brand D" is not stored in the bitmap index 250. Thus, the event processor 306 may store data for the event signal 503 in the data store 308. The event processor 306 (or a background process or thread) may determine that because of the event signal 503, "Store B" (which has a count of 5) has fallen outside of the top N brands and that "Clothing Brand D" (which now has a count of 6) has become elevated into the top N brands. In response to the determination, a bit string 510 for "Store B" may be replaced in the bit string index 250 with a bit string 512 for "Clothing Brand D."

Figure 6:
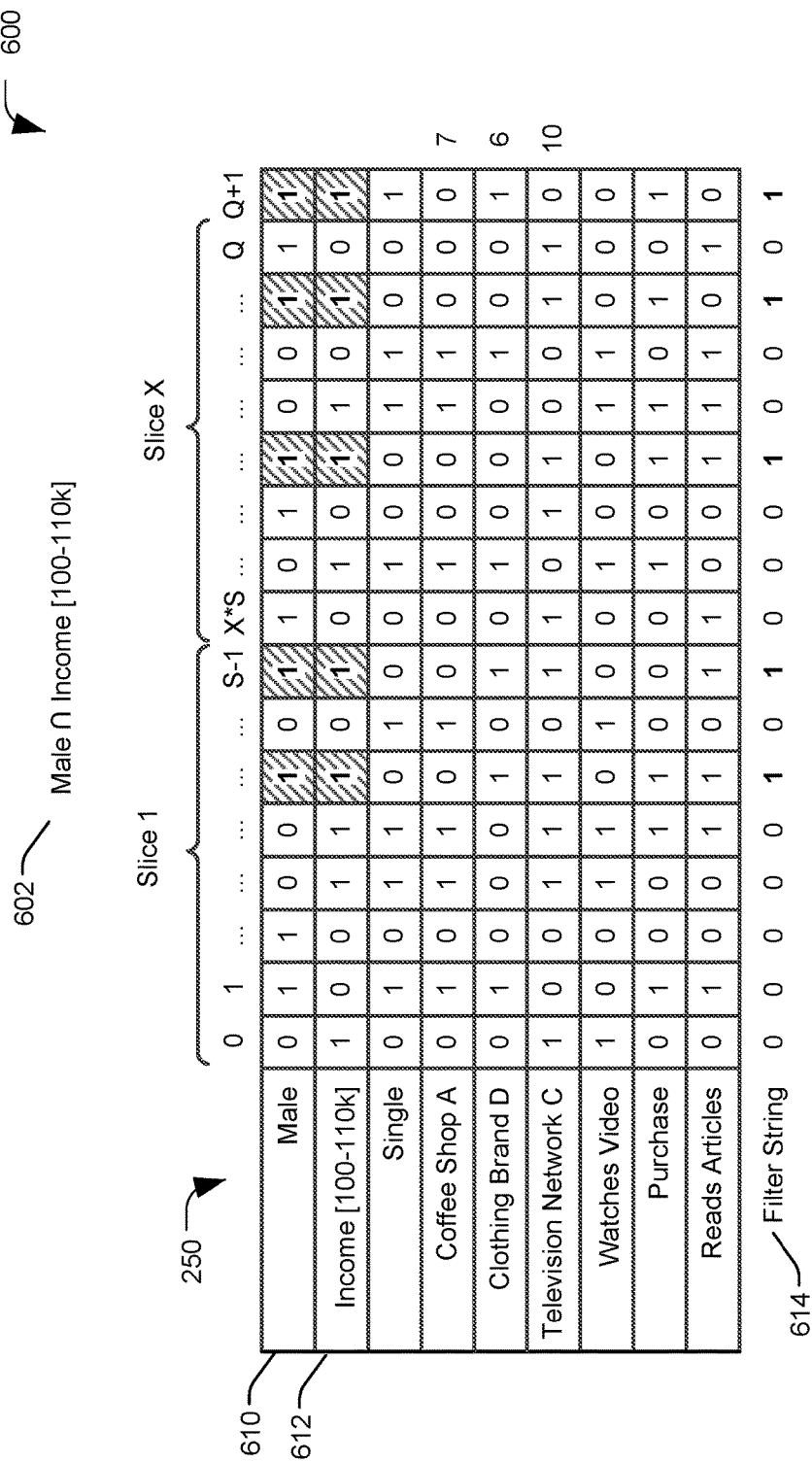
FIG. 6 is a diagram to illustrate a particular embodiment of a method of using a bitmap index during execution of a query.

FIGS. 3-5 thus illustrate various operations that may be performed during generation and maintenance of the bitmap index 250. The bitmap index 250 may also be used during execution of queries. For example, FIG. 6 illustrates a particular embodiment of executing (e.g., resolving) a query 602 using the bitmap index 250 and is generally designated 600. The query 602 may be received and executed by the query execution module 124 of FIG. 1. The result of executing the query 602 is another bit string 614, referred to herein as a "filter string." In the illustrated example, the query 602 corresponds to an intersection operation between the "Male" and "Income [100-110 k]" demographic properties (i.e., corresponds to the question "Which of my audience members is male and has a household income between $100,000 and $110,000?"). Thus, the filter string 614 may correspond to a custom segment of an audience of a particular property that is associated with the bitmap index 250. The custom audience segment may correspond to an aggregation of audience segments generated using one or more set operations, such as logical AND operations and logical OR operations.

Resolving the query 602 may including ANDing each bit string location (i.e., each user) of a "Male" bit string 610 with a corresponding location of an "Income [$100-110 k]" bit string 612, as shown. When both corresponding locations contain a "1," the corresponding location of the filter string 614 is set to 1. At the conclusion of the AND operations, the filter string 614 corresponds to a custom audience segment of men who earn $100,000-$110,000.

In a particular embodiment, the filter string 614 is stored and available for use during execution of subsequent queries. The filter string 614 may also be used to query the data store 308 (e.g., cloud-based storage) or the SQL database 310 (e.g., a user profile database) regarding the custom audience segment. It should be noted that while the illustrated query 602 calls for a single set operation to generate the filter string 614, the described techniques may be used with more complex queries that involve any number of union operations, intersection operations, and/or count operations. For example, FIG. 7 illustrates a particular embodiment of resolving a (more complex) second query 702 to generate a second filter string 716, and is generally designated 700. In FIG. 7, the query 702 is a top Z brand affinities query (where Z is a positive integer).

The query 702 requests identification of audience members that are male and that like "Coffee Shop A" or have made a purchase on the media property. The filter string 716 may be generated by ORing a "Coffee Shop A" bit string 712 with a "Purchase" bit string 714 to generate an intermediate result string (not shown). The filter string 716 may be generated by ANDing the "Male" bit string 610 with the intermediate result string. The audience members having a "1" in the filter string 716 represent the audience members who are male and either have a brand affinity for "Coffee Shop A" or have made a purchase. In a particular embodiment, the filter string 716 may be stored and used during execution of subsequent queries. For example, to answer the question "What are the top 50 brands for men in my audience that either have an affinity for Coffee Shop A or have made a purchase?" the filter string 716 may be generated. The filter string 716 may be ANDed with each of the brand affinity bit strings to generate result strings. Count operations may be performed on the result strings and the 50 brand affinities with the highest counts may be returned in response to the question.

It will be appreciated that during query execution, the AND/OR operations performed on bit strings are performed one bit at a time, and the result of an operation on any single bit location does not impact the result of the operation on any other bit location. Thus, query execution may be parallelized. For example, when slices of the bit strings are stored at different network nodes, performing an operation with respect to bit strings may be parallelized into performing the operation with respect to individual slices at individual nodes. To determine where and in what order such parallel operations should be performed, a query execution module may generate a query execution plan.

Figure 8:
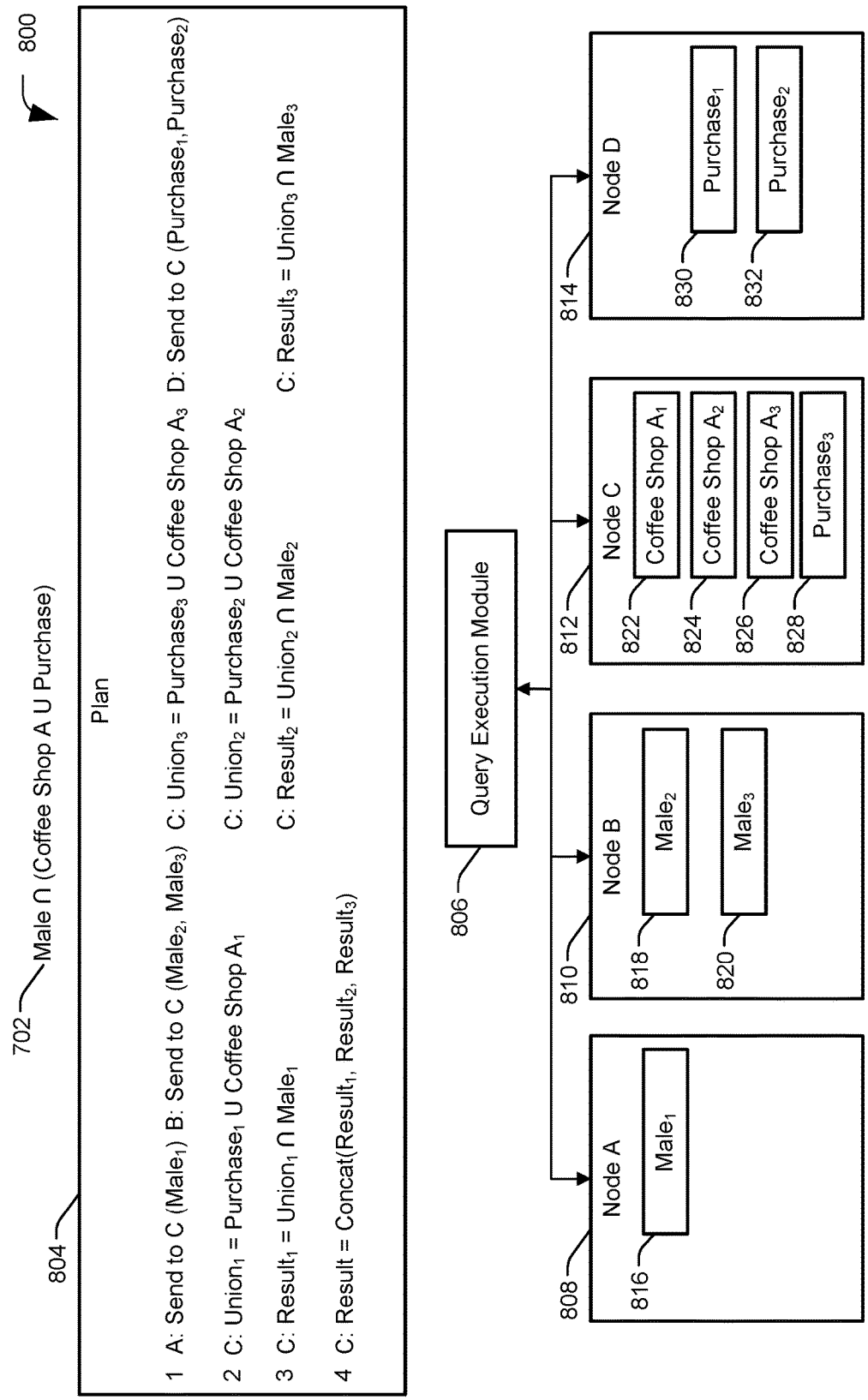
FIG. 8 is a diagram to illustrate a particular embodiment of a method of generating a query execution plan corresponding to the query of FIG. 7.

For example, FIG. 8 illustrates a particular embodiment of generating of a query execution plan 804 to resolve the query 702 of FIG. 7, and is generally designated 800. Upon receiving the query 702, a query execution module 806 may generate a query execution plan 804. In a particular embodiment, because data transfers between nodes may represent a bottleneck, the query execution plan 804 may be generated such that data transfers are reduced/minimized. In a particular embodiment, the query execution module 806 is part of one of the nodes 808-814. Alternately, the query execution module 806 may be part of a separate node (e.g., a load-balancing node).

For example, the query execution module 806 may determine that resolution of the query 702 of FIG. 7 involves performing operations on the "Male" bit string, the "Coffee Shop A" bit string, and the "Purchase" bit string. In the illustrated example, each of the bit strings has three slices. A first slice 816 of the "Male" bit string, designated $Male_1$ is stored on Node A 808. A $Male_2$ slice 818 and a $Male_3$ slice 820 are stored on Node B 810. Coffee Shop $A_1$, Coffee Shop $A_2$, Coffee Shop $A_3$, and $Purchase_3$ slices 822, 824, 826, and 828 are stored on Node C 812. $Purchase_1$ and $Purchase_2$ slices 830 and 832 are stored on Node D 814.

The query execution plan 804 identifies operations and at what nodes are to perform the operations. For example, the query execution plan 804 indicates that in a first step, Node C 812 is to perform a union (OR) operation between Coffee Shop $A_3$ slice 826 and the $Purchase_3$ slice 828 to generate an intermediate result slice $Union_3$. In parallel, Node A 808 is to transfer a copy of the $Male_1$ slice 816 to Node C 812 and Node B 810 is to transfer copies of the $Male_2$ slice 818 and the $Male_3$ slice 820 to Node C 812. Node D is to transfer copies of the Purchase' slice 830 and the $Purchase_2$ slice 832 to Node C 812.

In a second step, Node C 812 performs two operations in parallel: ORing the $Purchase_1$ slice 830 and the Coffee Shop $A_1$ slice 822 to generate an intermediate result slice $Union_1$, and ORing the $Purchase_2$ slice 832 and the Coffee Shop $A_2$ slice 824 to generate an intermediate result slice $Union_2$.

In a third step, Node C 812 performs three operations in parallel to generate three intermediate bit strings. The first intermediate bit string $Result_1$ is generated by ANDing the $Union_1$ slice with the $Male_1$ slice. The second intermediate bit string $Result_2$ is generated by ANDing the $Union_2$ slice with the $Male_2$ slice. The third intermediate bit string $Result_3$ is generated by ANDing the $Union_3$ slide with the $Male_3$ slice. In a fourth step, Node C concatenates the $Result_1$, $Result_2$, and $Result_3$ bit strings to generate the filter string 716 of FIG. 7.

FIG. 8 thus illustrates generation of a query execution plan for a query. In a particular embodiment, the query execution plan is generated prior to performing any set operations. The query execution plan may be generated so as to increase the number of parallel operations and reduce the number of bit string (or slice) transfers between nodes, which may result in improved query execution latency.

Figure 9:
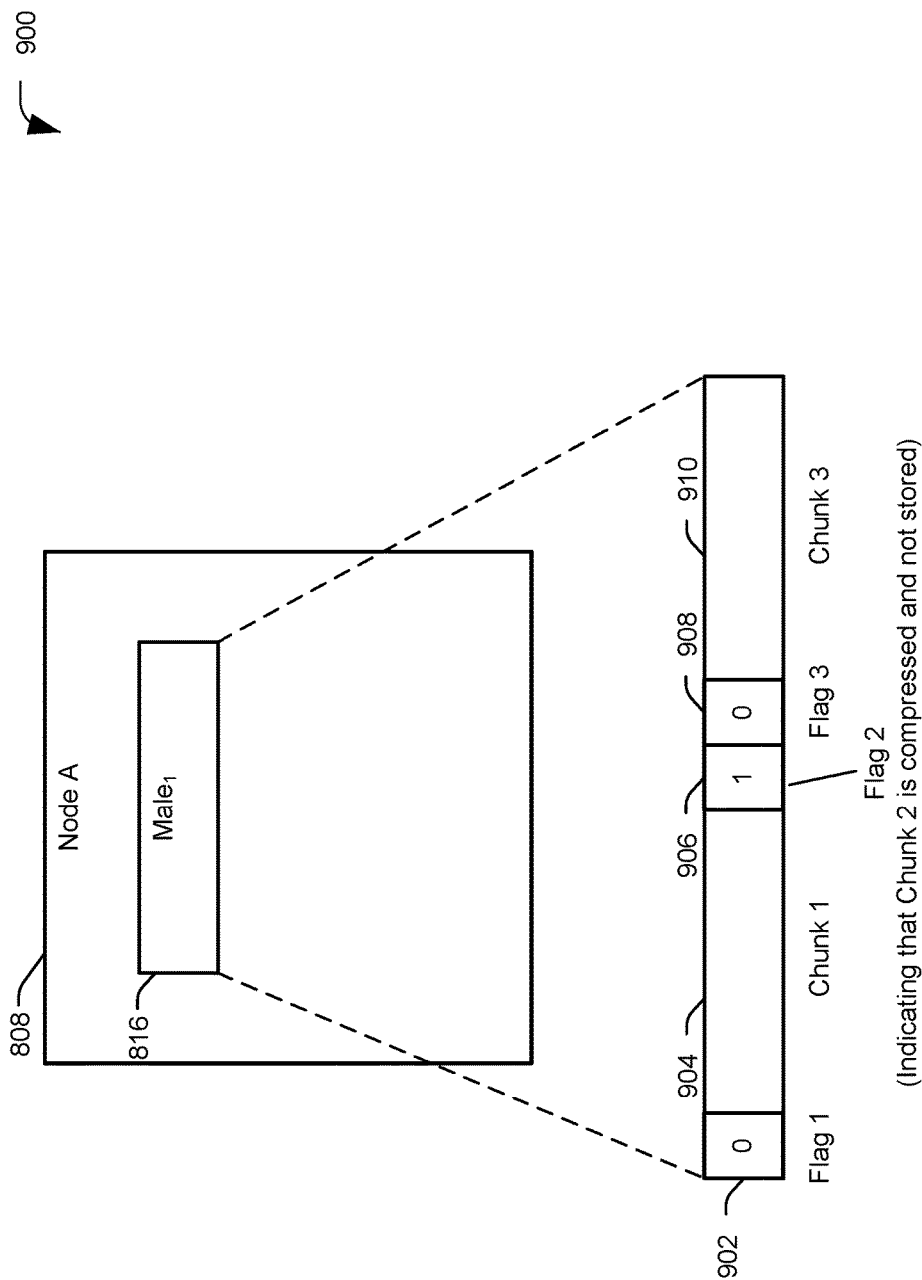
FIG. 9 is a diagram to illustrate a particular embodiment of a method of compressing and storing a bit string of a bitmap index.

In the foregoing description, bit strings are described as being subdivided into slices. For example, each slice may include 64 kibibits (1 kibibit=$2^{10}$ bits=1,024 bits). In a particular embodiment, slices may be further divided into "chunks." For example, chunks may be up to 2 kibibits in length (e.g., each slice is subdivided into 32 chunks). To reduce the amount of space occupied by bit strings of a bitmap index, chunks may be stored in a compressed fashion. For example, FIG. 9 illustrates a particular embodiment of compressing and storing data of a bitmap index and is generally designated 900. In particular, FIG. 9 depicts Node A 808 of FIG. 8, which stores the $Male_1$ slice 816. The $Male_1$ slice 816 may be compressed in accordance with various compression schemes. In the illustrated compression scheme, chunks that have only zeroes are not stored. Chunks that include a one are stored. A flag corresponding to each chunk is stored. If a flag has a value of zero, the corresponding chunk is stored in its entirety. For example, a first flag 902 and a third flag 908 have a value of zero, indicating that corresponding first chunk 904 and third chunk 910 are stored at Node A 808. If a flag has a value of one, the corresponding chunk is "compressed" by not being stored. For example, a second flag 906 has a value of one, indicating that a corresponding second chunk includes only zeroes and is not stored. During queries, the second chunk may be dynamically generated by introducing zeroes (e.g., 2,048 zeroes) between the first chunk 904 and the third chunk 910.

While FIG. 9 illustrates one example of a compression scheme, in alternate embodiments, different compression schemes may be used. Further, data for the compression scheme may be stored in different places. For example, the chunks 904 and 910 may be stored at Node A 808, and the flags 902, 906, and 908 may be stored in a different location (e.g., as part of a hash table that is used to identify where slices/chunks of a bit string are stored).

Figure 10:
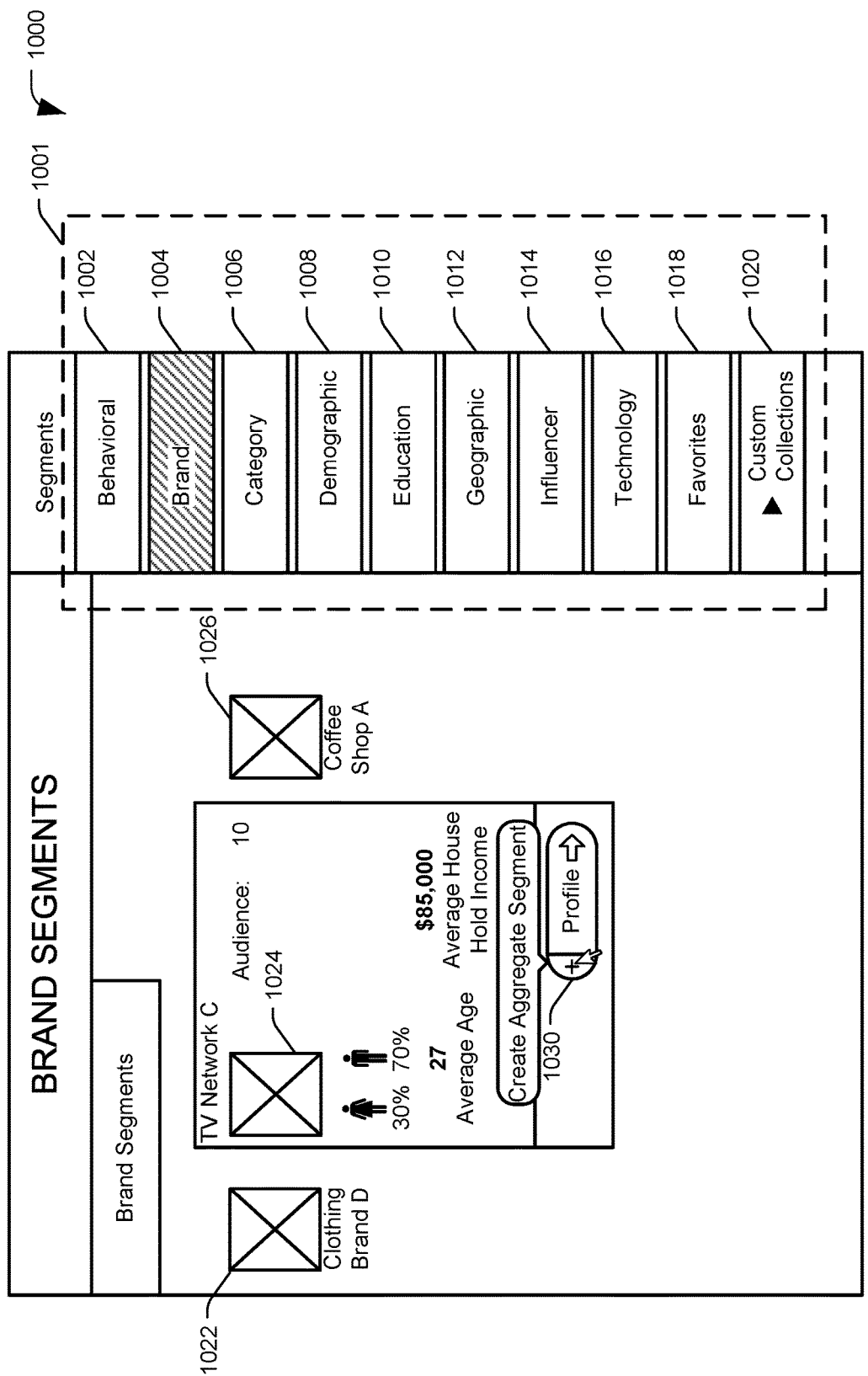
FIG. 10 is a diagram to illustrate a particular embodiment of a graphical user interface (GUI) that includes a brand segment.

Referring to FIG. 10, a diagram of a graphical user interface (GUI) 1000 corresponding to a brand segment is shown. The GUI 1000 includes options 1001 to view particular types of segments. For example, the options 1001 include a behavioral option 1002, a brand option 1004, a category option 1006, a demographic option 1008, an education option 1010, a geographic option 1012, a technology option 1016, a favorites option 1018, and a custom collections option 1020. It should be noted that while the aforementioned ten options are shown in FIG. 10, the GUI 1000 may include more, fewer, and/or different options. Selecting a particular segment type option 1001 may cause the GUI 1000 to display segments of the particular segment type. Each segment may correspond to a bit string of a bitmap index.

In the illustrated example, the brand option 1004 is selected, and the GUI 1000 accordingly displays brand segments. Each brand segment corresponds to a brand affinity bit string of the bitmap index 250. Thus, the GUI 1000 displays icons corresponding to a "Clothing Brand D" brand segment 1022, a "TV Network C" brand segment 1024, and a "Coffee shop A" brand segment 1026. Each of the icons may be selectable (e.g., by clicking on the icon, hovering a pointer over the icon, etc.).

Upon receiving a selection of a particular icon, the GUI 1000 may display an overlay that includes additional information about the selected segment. In the illustrated example, the GUI 1000 displays that ten audience members have a brand affinity for "TV Network C." Thirty percent of those audience members are female, seventy percent are male, the average age of the audience is 27, and the average household income is $85,000.

The GUI 1000 also displays a create aggregate segment option 1030. The create aggregate segment option 1030 may be selected to create a custom aggregate segment using the selected "TV Network C" segment 1024. To illustrate, referring to FIG. 11, an overlay 1102 may be displayed on the GUI 1000. The overlay 1102 includes an icon for the "TV Network C" segment. The overlay 1102 also includes a drop-down menu 1104 to select a set operation, such as an AND operation or an OR operation. In the illustrated example, the AND operation is selected. The overlay 1102 further includes an option 1106 to search for a segment to AND with the "TV Network C" segment. The overlay 1102 includes an option 1108 to assign a name to the created custom segment, so that the segment may be retrieved in the future (e.g., via the custom collections option 1020 of FIG. 10).

In a particular embodiment, the overlay 1102 includes a profile option 1110. When selected, the profile option 1110 may generate a query based on the segments and set operations selected in the overlay 1102. The query may be resolved to generate an aggregate segment, and profile data for the aggregate segment may be displayed. Thus, the GUI 1000 of FIGS. 10-11 may enable a user to view segments, create custom segments and queries, execute queries, and view results of query execution.

Figure 12:
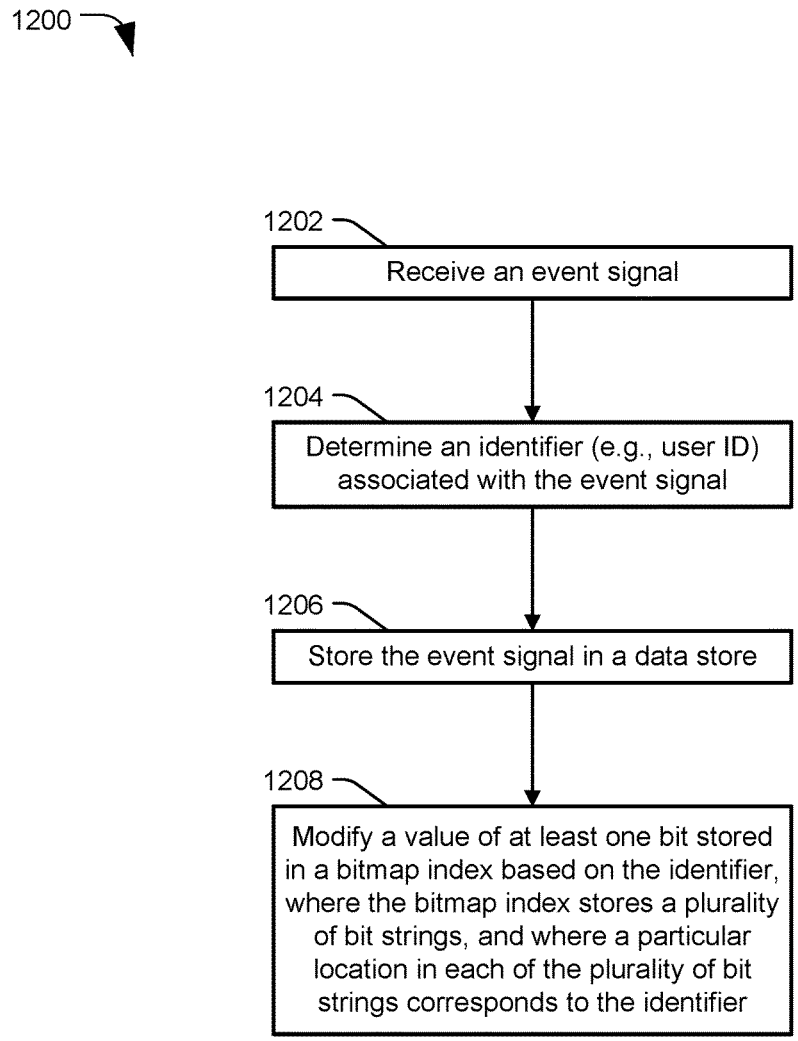
FIG. 12 is a flowchart to illustrate another particular embodiment of a method of updating a bitmap index.

Referring to FIG. 12, a particular embodiment of a method 1200 of updating a bitmap index is shown. In an illustrative embodiment, the method 1200 may be performed by the measurement system 120 of FIG. 1 and may be illustrated with reference to FIG. 3.

The method 1200 includes receiving an event signal, at 1202. For example, in FIG. 3, the event processor 306 may receive an event signal corresponding to the new user registration event 303 for the user 302. As another example, in FIG. 4, the event processor 306 may receive the event signal 403, indicating that the user 302 made a purchase.

The method 1200 also includes determining an identifier associated with the event signal, at 1204. For example, in FIG. 3, the event processor 306 may determine that the user 302 is a new user and is to be assigned a new user ID. In response, the event processor 306 may assign the identifier (Q+1) 314 to the user 302. As another example, in FIG. 4, the event processor 306 may determine that the event signal is associated with the user ID (Q+1) 314 for the user 302.

The method 1200 further includes storing the event signal (or data corresponding thereto) in a data store, at 1206. For example, the event signal may be stored in offsite storage, such as the cloud-based storage 140 of FIG. 1 or the data store 308 of FIG. 3.

The method 1200 includes modifying a value of at least one bit stored in the bitmap index based on the identifier, at 1208. The bitmap index stores a plurality of bit strings. A particular location in each of the plurality of bit strings corresponds to the identifier. For example, in FIG. 3, the event processor 306 may set the $(Q+1)^{th}$ values of the "Male," "Income [100-110 k]" and "Single" bit strings to one. As another example, in FIG. 4, the event processor 306 may set the $(Q+1)^{th}$ value of the "Purchase" bit string to one. The method 1200 may thus enable updating and maintaining a bitmap index as additional measurement data is received. Keeping the bitmap index updated may enable quick resolution of queries.

Referring to FIG. 13, a particular embodiment of a method 1300 of using a bitmap index during execution of a query is shown. In an illustrative embodiment, the method 1300 may be performed by the measurement system 120 of FIG. 1 and may be illustrated with reference to FIG. 8.

The method 1300 includes receiving a query directed to a bitmap index, at 1302. The bitmap index includes a plurality of bit strings, where a particular location in each of the plurality of bit strings corresponds to a particular user identifier. The plurality of bit strings is stored in a distributed fashion across a plurality of nodes. For example, referring to FIGS. 7-8, the query execution module 806 may receive the query 702 directed to the bitmap index 250. For ease of illustration, the bitmap index 250 is illustrated as a grid, where each row corresponds to a bit string and each column corresponds to a particular user ID. In a particular embodiment, the bit strings may be subdivided into slices and chunks, as described with reference to FIG. 9.

The method 1300 also includes determining a subset of nodes, where each node in the subset stores at least a portion of a bit string related to the query, at 1304. For example, in FIG. 8, the query execution module 806 may determine that nodes A-D 808-814 store slices 816-832 of bit strings related to the query 702.

The method 1300 further includes generating a query execution plan for the received query, at 1306. The query execution plan identifies one or more set operations, one or more nodes of the subset of nodes to perform each of the one or more set operations, and a particular node to consolidate results of the one or more set operations to generate a result bit string that indicates a result of the query. For example, in FIG. 8, the query execution module 806 may generate the query execution plan 804. The query execution plan 804 identifies a plurality of set operations and which node each set operation is to be performed on. The query execution plan 804 also indicates, at step 4, that Node C 812 generates the filter string 716 that represents the resolution of the query 702.

Figure 14:
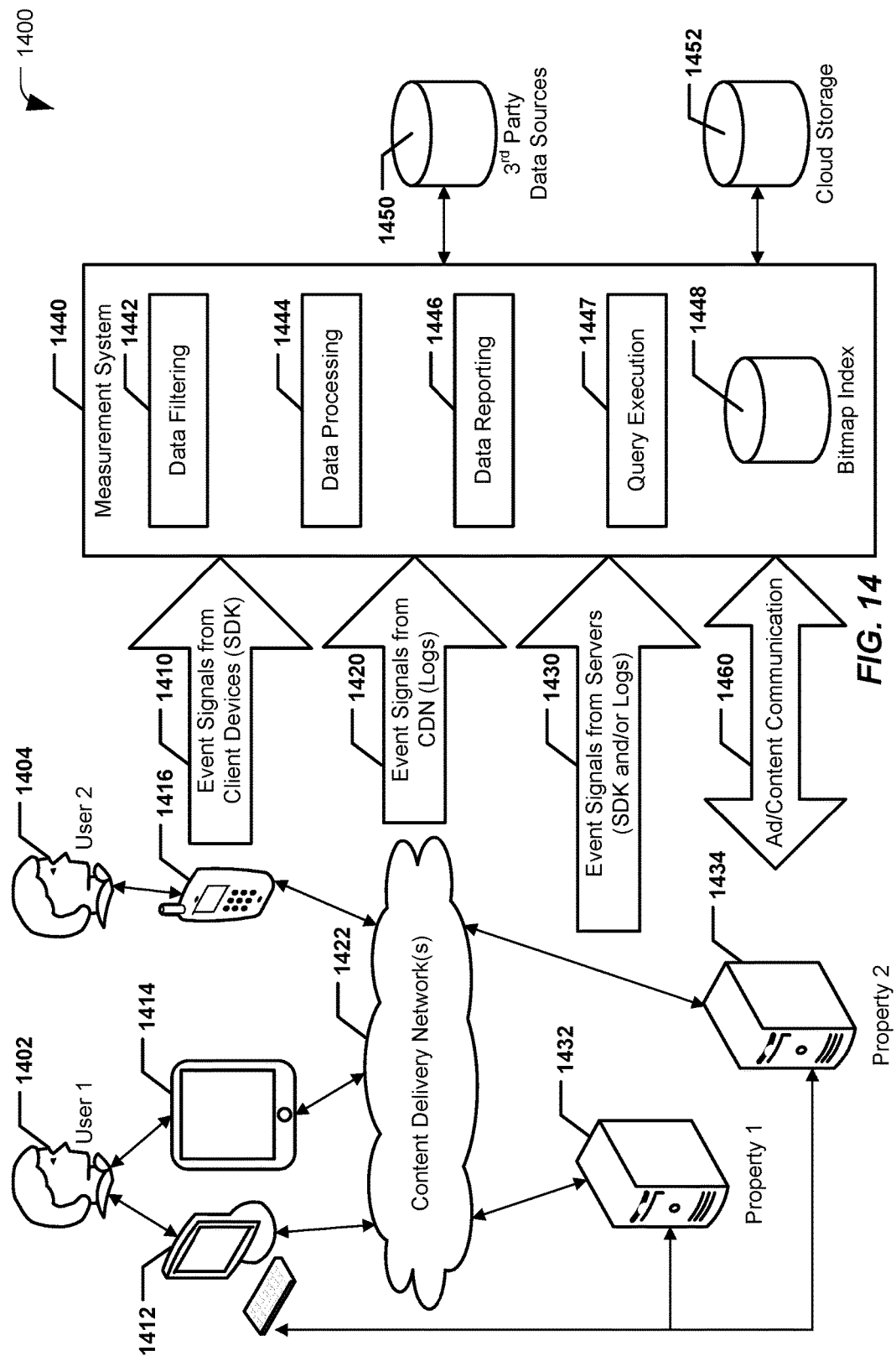
FIG. 14 is a diagram to illustrate a particular embodiment of an audience measurement system that is operable to generate and use a bitmap index.
Figure 15A:
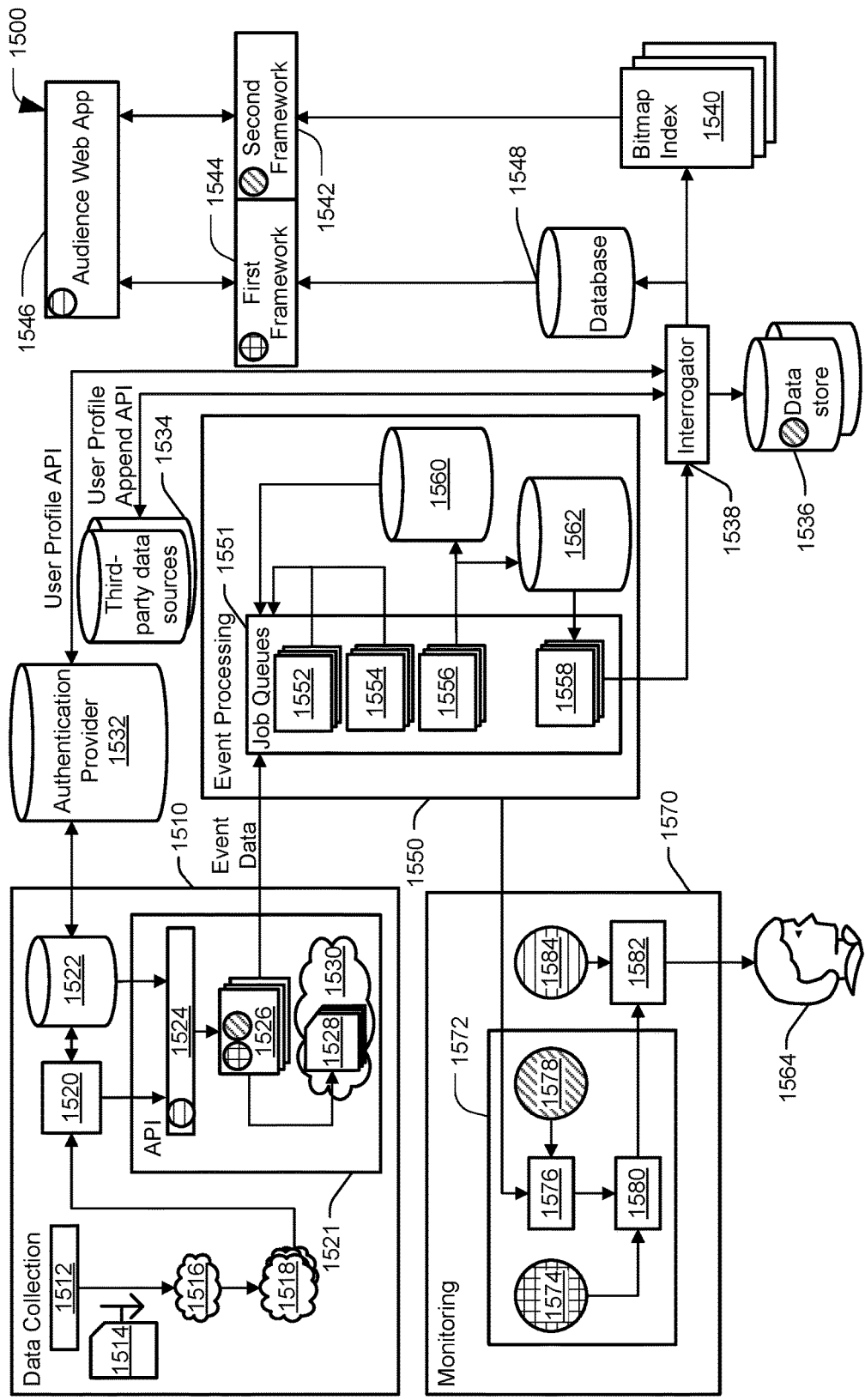
FIGS. 15A, 15B, 15C, and 15D are diagrams to illustrate another particular embodiment of an audience measurement system that is operable to generate and use a bitmap index.
Figure 15B:
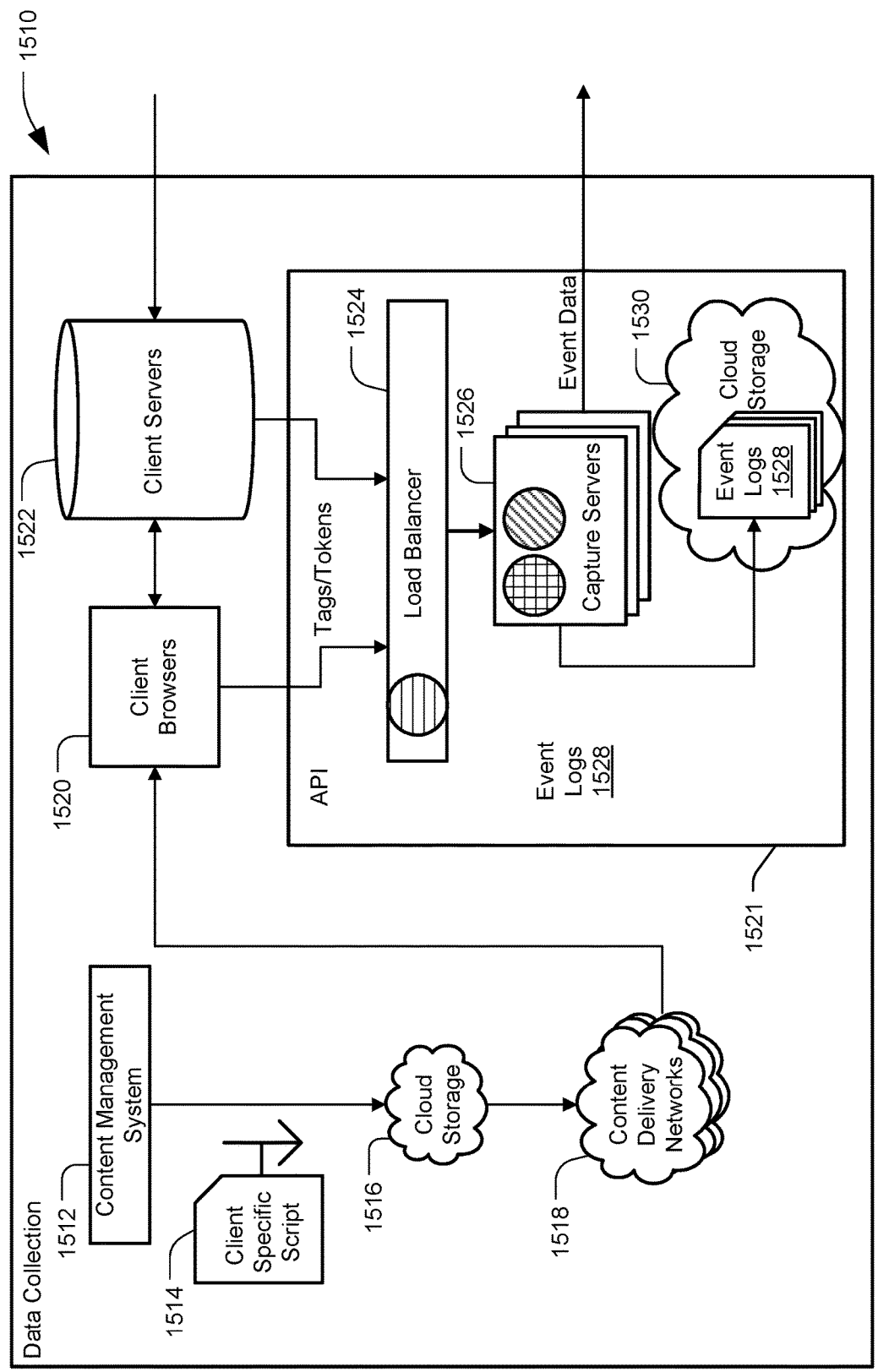
Figure 15C:
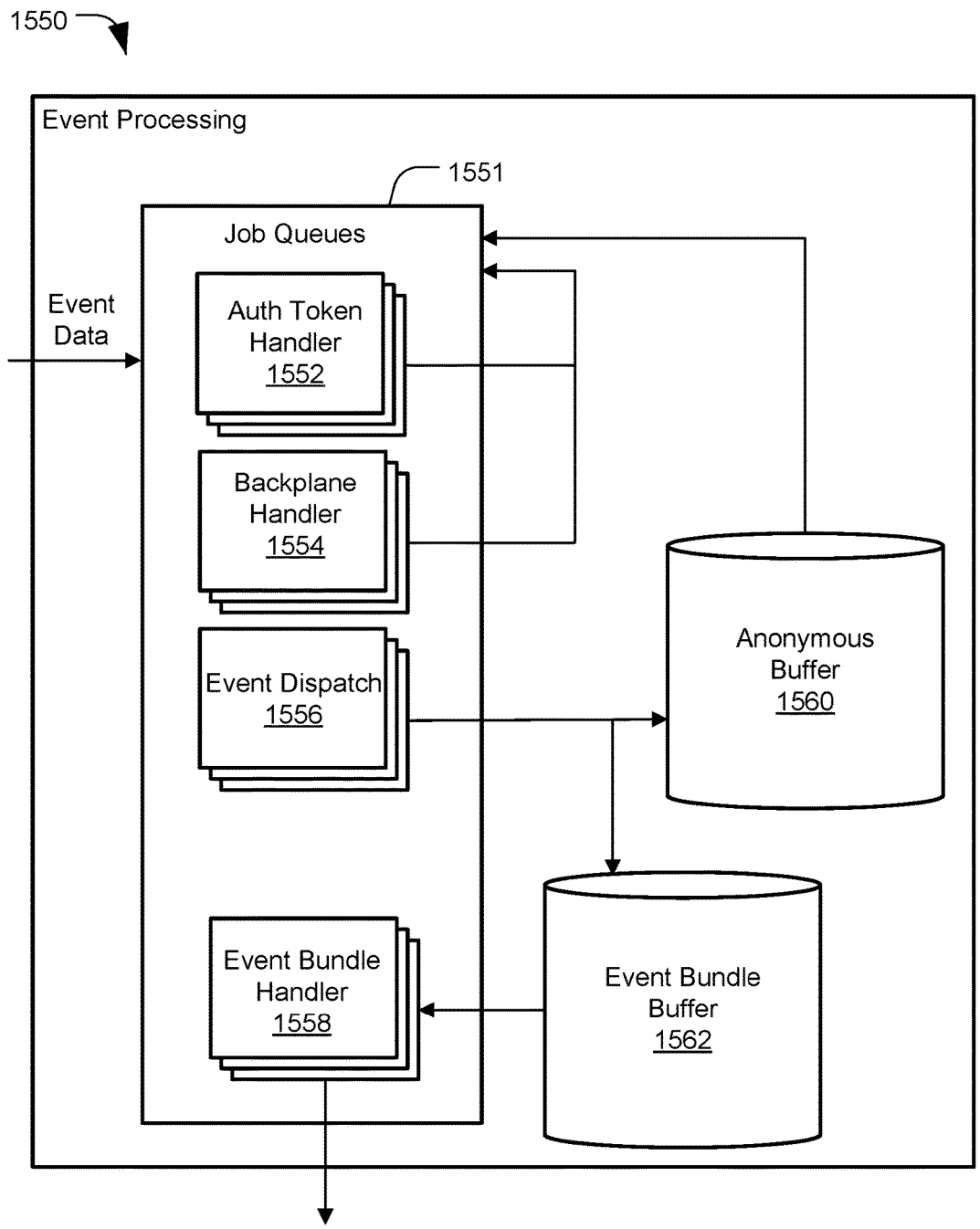
Figure 15D:
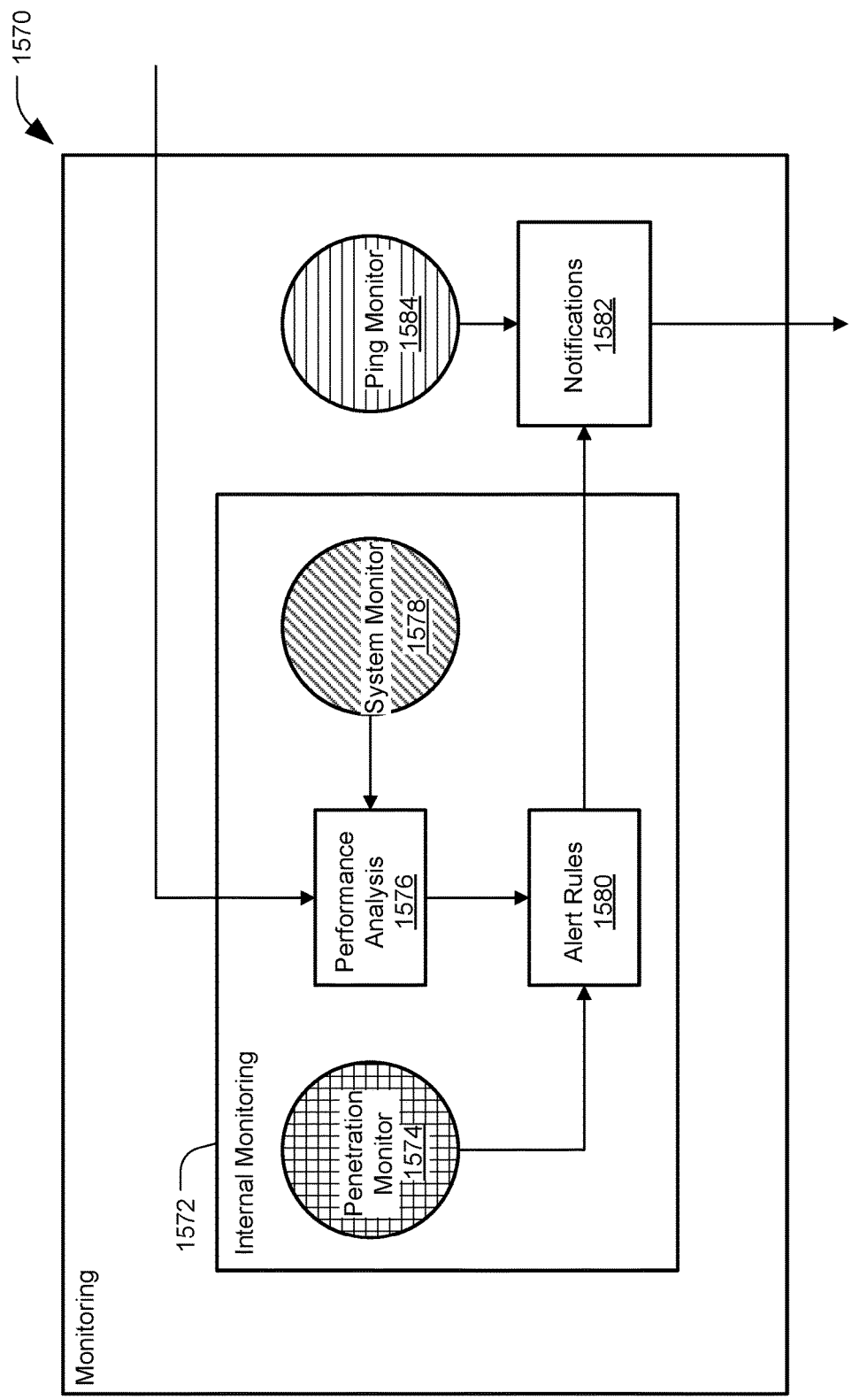

FIGS. 1-13 thus illustrate systems and methods of generating, updating, and using a bitmap index. The bitmap index may enable a measurement system, such as the measurement system 120, to quickly provide analysis for "raw" data stored in an offsite (e.g., cloud-based) storage location. The bitmap index may represent an on-the-fly index of binary representations of different audience traits that can be mined to determine what set of audience members is most likely to be receptive to particular content or a particular advertisement. Audience traits may be combined into long bit strings, where each bit string represents a single trait for an entire audience. By keeping the bitmap index "hot" in memory, ad-hoc queries may be performed efficiently and with reduced latency. Moreover, it will be appreciated that maintaining the bitmap index in memory may be less memory-intensive than keeping all "raw" data in memory. The described techniques may also be used with other types of systems. For example, in alternate embodiments, the same location in each bit string of the bitmap index may correspond to an identifier other than a user ID, such as an inventory number, an employee number, a hospital patient identifier, etc. FIGS. 14 and 15 illustrate additional scenarios in which a bitmap index may be generated and used.

In particular, FIG. 14 illustrates an alternate embodiment of a measurement system 1440, and is generally designated 1400. The measurement system 1440 may be communicatively coupled to one or more user devices (e.g., illustrative user devices 1412, 1414, and 1416), to one or more content delivery networks (CDNs) (e.g., illustrative CDN 1422), and to properties (e.g., websites) 1432 and 1434. In FIG. 14, the properties 1432 and 1434 are illustrated by corresponding servers (e.g., web servers). The measurement system 1440 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks and/or wide area networks (e.g., the Internet).

The user devices 1412-1416 may be associated with various users. For example, the desktop computing device 1412 and the tablet computing device 1414 may be associated with a first user 1402, and the mobile telephone device (e.g., smartphone) 1416 may be associated with a second user 1404. It should be noted that the user devices 1412-1416 are shown for example only and are not to be considered limiting. In alternate embodiments, fewer, additional, and/or different types of user devices may be present in the system 1400. For example, a radio-frequency identification (RFID)-enabled device may be carried by a user and may transmit a signal in response to detecting that the user is visiting a particular physical location. In a particular embodiment, the user devices 1412-1416 may execute applications that are operable to access the properties 1432 and 1434. For example, the user devices 1412-1416 may include applications developed using a mobile software development kit (SDK) that includes support for audience measurement functions. To illustrate, when the SDK-based applications interact with the properties 1432 and 1434, the applications may generate first event signals 1410 that are transmitted by the user devices 1412-1416 to the measurement system 1440.

The first event signals 1410 may include information identifying specific interactions by the users 1402-1404 via the user devices 1412-1416 (e.g., what action was taken at a media property, when the action was taken, for how long the action was taken, etc.). The user interactions may include interactions with advertisements presented by the media property and/or interactions with content presented by the media property. The event signals 1410 may also include an identifier, such as a browser identifier (browser ID) generated by the SDK. In a particular embodiment, browser identifiers are unique across software installations and devices. For example, a first installation of a SDK-based application at the desktop computing device 1412 and a second installation of the same SDK-based application at the tablet computing device 1414 may use different browser IDs, even though both installations are associated with the same user 1402.

In another particular embodiment, Browser IDs may remain consistent until applications or web browsers are "reset" (e.g., caches/cookies are cleared). In some embodiments, the user devices 1412-1416 may execute applications other than browser applications, such as downloadable mobile applications, that generate the event signals 1410 based on user interactions with advertisements and/or content presented by the applications.

The user devices 1412-1416 may access content provided by the properties 1432 and 1434 directly or via the CDN 1422. The CDN 1422 may provide distributed, load-balanced access to audio, video, graphics, and web pages associated with the media properties 1432 and 1434. For example, the CDN 1422 may include geographically distributed web servers and media servers that serve Internet content in a load-balanced fashion. The CDN 1422 may send second event signals 1420 to the measurement system 1440. The second event signals 1420 may include information identifying interactions with media properties and browser IDs provided to the CDN 1422 by the user devices 1412-1416 and/or the properties 1432 and 1434. For example, the second event signals 1420 may include CDN logs or data from CDN logs.

The media properties 1432 and 1434 may be controlled by the same entity (e.g., may be part of a federated property) or by different entities. The properties 1432 and 1434 may send third event signals 1430 to the measurement system 1440. The third event signals 1430 may include information identifying interactions with the media properties and browser IDs provided by the user devices 1412-1416 during communication with the properties 1432 and 1434 (e.g., communication via hypertext transfer protocol (HTTP), transport control protocol/internet protocol (TCP/IP), or other network protocols).

In a particular embodiment, the third event signals 1430 may include server logs or data from server logs. Alternately, or in addition, the third event signals 1430 may be generated by SDK-based (e.g., web SDK-based) applications executing at the properties 1432 and 1434, such as scripts embedded into web pages hosted by the properties 1432 and 1434.

The first event signals 1410 from the user devices 1412-1416 and the second event signals 1420 generated by the CDN 1422 may be considered "first-party" event signals. The third event signals 1430 from the properties 1432 and 1434 may be considered "third-party" event signals. First party event signals may be considered more trustworthy and reliable than third party event signals, because of the possibility that third party event signals could be modified by a media property owner prior to transmission to the measurement system 1440.

In a particular embodiment, the properties 1432 and 1434 may send data to the measurement system 1440 and receive data from the measurement system 1440 regarding advertisements and/or content presented by the properties 1432 and 1434. Such communication is illustrated in FIG. 14 as advertisement/content communication 1460. For example, an advertisement (or software associated with the advertisement that is executing on a client device, such as web server, a computer, a mobile phone, a tablet device, etc.) may collect and transmit data on a per-advertisement, per-user basis. The data may include or identify a profile of a user, a duration that the user viewed the advertisement, action(s) performed by the user with respect to the advertisement, etc. As another example, a content item or software associated therewith may collect and transmit data regarding user interactions with the content item.

In a particular embodiment, the measurement system 1440 includes a data filtering module 1442, a data processing module 1444, a data reporting module 1446, and a query execution module 1447. In a particular embodiment, each of the modules 1442-1447 is implemented using instructions executable by one or more processors at the measurement system 1440.

The data filtering module 1442 may receive the event signals 1410, 1420, and 1430. The data filtering module 1442 may check the event signals 1410, 1420, and 1430 for errors and may perform data cleanup operations when errors are found. The data filtering module 1442 may also receive and perform cleanup operations on advertisement measurement data and content measurement data received from the properties 1432 and 1434 and from applications executing on the user devices 1412-1416. In a particular embodiment, the data filtering module 1442 may implement various application programming interfaces (APIs) for event signal collection and inspection. The data filtering module 1442 may store authenticated/verified event signals in a database, event cache, archive, and/or cloud storage 1452. In a particular embodiment, the measurement system 1440 includes or has access to a brand database that tracks brands. For example, "raw" data corresponding to the brand database and other collected data may be stored in the cloud storage 1452. Signals received from the properties 1432 and 1434 and from applications executing the user devices 1412-1416 may identify a brand that matches one of the brands in the brand database. The measurement system 1440 may thus track advertisements/content for various brands across multiple properties.

The data processing module 1444 may operate as described with reference to the data processing module 122 of FIG. 1. Alternately, or in addition, the data processing module 1444 may associate received event signals (and interactions represented thereby) with user profiles of users. For example, when an event signal having a particular browser ID is a social networking registration event (e.g., when a user logs into a website using a Facebook® account, a Twitter® account, a LinkedIn® account, or some other social networking account), the data processing module 1444 may retrieve a corresponding social networking profile or other user profile data from third party data sources 1450. Facebook is a registered trademark of Facebook, Inc. of Menlo Park, Calif. Twitter is a registered trademark of Twitter, Inc. of San Francisco, Calif. LinkedIn is a registered trademark of LinkedIn Corp. of Mountain View, Calif.

It will be appreciated that interactions that were previously associated only with the particular browser ID (i.e., "impersonal" alphanumeric data) may be associated with an actual person (e.g., John Smith) after retrieval of the social networking profile or user profile. Associating interactions with individuals may enable qualitative analysis of the audiences of media properties. For example, if John Smith is a fan of a particular sports team, the measurement system 1440 may indicate that at least one member of the audience of the first property 1432 or the second property 1434 is a fan of the particular sports team. When a large percentage of a media property's audience shares a particular characteristic or interest, the media property may use such information in selecting and/or generating advertising or content. User profiles (e.g., a profile of the user John Smith) and audience profiles (e.g., profiles for the media properties associated with the properties 1432 and 1434) may be stored in the cloud storage 1452 and/or in another database, as further described with reference to FIG. 15. An audience profile for a particular media property may be generated by aggregating the user profiles of the individual users (e.g., including John Smith) that interacted with the particular media property.

Audience profiles may be generated using as few as one or two user profiles, although any number of user profiles may be aggregated. In a particular embodiment, audience profiles may be updated periodically (e.g., nightly, weekly, monthly, etc.), in response to receiving updated data for one or more users in the audience, in response to receiving a request for audience profile data, or any combination thereof. Audience profiles may similarly be generated for audiences of a particular mobile application based on signals generated by installations of the mobile application on various user devices.

Figure 11:
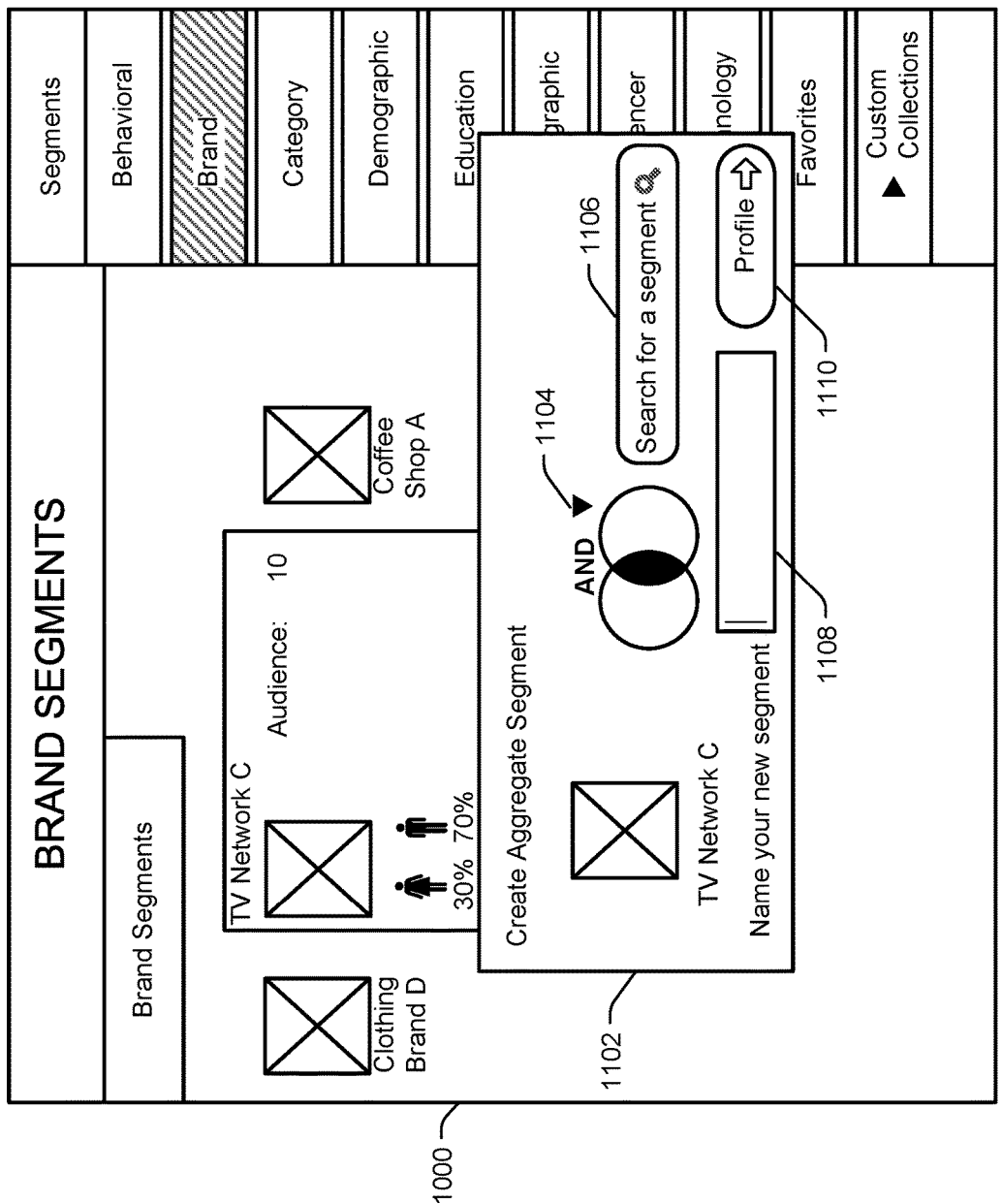
FIG. 11 is a diagram to illustrate a particular embodiment of a GUI that is operable to create a brand segment using logical operations.

The data reporting module 1446 may generate various interfaces, such as the GUI 1000 of FIGS. 10-11. The data reporting module 1446 may also support an application programming interface (API) that enables external devices to view and analyze data collected and stored by the measurement system 1440. In a particular embodiment, the data reporting module 1446 is configured to segment the data.

As used herein, a "segment" is based on a group of people (e.g., an audience or a subset thereof). As further described herein, a digital genome may be determined for each segment. Examples of segments include, but are not limited to, brand affinity segments (also called brand segments), demographic segments, geographic segments, social activity segments, employer segments, educational institution segments, professional group segments, industry category of employer segments, brand affinity category segments, professional skills segments, job title segments, and behavioral segments. In a particular embodiment, behavioral segments are defined by a client (e.g., property owner or publisher) or by the measurement system 1440, and represent actions taken on a client's property.

Additional examples of segments include segments based on an advertisement, an advertisement campaign, an advertisement placement, an advertisement context, a content item, a content context, content placement, a platform (e.g., desktop/laptop computer vs. mobile phone vs. tablet computer), etc. Segments may be used to understand or evaluate characteristics of an audience, craft a content strategy, generate advertising leads, create advertising pitches, and respond to inbound advertising requests. Segments may also be used to acquire additional audience members, receive information from advertisements/content items, and send information to advertisements/content items. In a particular embodiment, the measurement system 140 may be operable to define "new" segments based on performing logical operations (e.g., logical OR operations and logical AND operations), as described with reference to FIGS. 7, 8, and 11.

The measurement system 1440 may also include a bitmap index 1448 (e.g., the bitmap index 126 of FIG. 1 and/or the bitmap index 250 of FIG. 2). The bitmap index 1448 may store bit strings corresponding to at least a subset of the "raw" data stored in the cloud storage 1452. In one example, a different bitmap index 1448 is maintained for each property 1432, 1434. The bitmap index 1448 for a particular property may include, for each audience member of the property, data regarding a demographic attribute of the audience member, a brand affinity of the audience member, and/or behaviors (e.g., interactions with the media property) of the audience member. The same location in each bit string of the bitmap index 1448 may correspond to the same user, as described with reference to FIGS. 1-2.

The data processing module 1444 may also be configured to, upon receiving an event signal, parse the event signal to identify what user and media property the event signal corresponds to. The data processing module 1444 may store data corresponding to the event signal in one or more databases (e.g., the cloud storage 1452, a user profile database, etc.). The data processing module 1444 may also store indexing data corresponding to the event signal in the bitmap index 1448 for the identified media property. If the user is a new audience member for the media property, the data processing module 1444 may assign a new ID to the user. Event signals may be processed as described above with reference to FIGS. 2-8.

The query execution module 1447 may operate as described with reference to the query execution module 124 of FIG. 1 and/or the query execution module 806 of FIG. 8. For example, the query execution module 1447 may receive a query and generate a query execution plan that parallelizes execution and reduces/minimizes data transfers between storage nodes during query execution.

During operation, the users 1402-1404 may interact with the media properties 1432 and 1434 and with applications executing on the user devices 1412-1416. In response to the interactions, the measurement system 1440 may receive the event signals 1410, 1420, 1430, and/or 1460. Each event signal may include a unique identifier, such as a browser ID and/or an audience member ID. If the user is a "new" audience member, the data processing module 1444 may create a user profile. Data for the user profile may be stored in the cloud storage 1452 and/or the bitmap index 1448. In a particular embodiment, data for the user profile may be retrieved from the third party data sources 1450.

For example, the data processing module 1444 may retrieve and store data from one or more social network profiles of the user. The data may include demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The data processing module 1444 may also collect and store data associated with advertisements and content served by the properties 1432 and 1434 and by applications executing on the user devices 1412-1416. In a particular embodiment, the measurement system 1440 is further configured to receive offline data from external data sources. For example, the measurement system 1440 may receive data regarding transactions (e.g., purchases) made by an audience and may use the transaction data to generate additional signals that contribute to the digital genome of an audience, brand, property, etc. Another example of offline data may be a "data dump" of data collected by an RFID-enabled device or an RFID detector. Offline data may be stored in one or more computer-readable files that are provided to the measurement system 1440. In a particular embodiment, offline data can include previously collected data regarding users or audience members (e.g., names, addresses, etc.).

The data reporting module 1446 may report data collected by the measurement system 1440. For example, the data reporting module 1446 may generate reports based on an audience profile of a media property (or application), where the audience profile is based on aggregating user profiles of users that interacted with the media property (or application). To illustrate, the data reporting module 1446 may generate an interface, such as the GUI 1000 of FIGS. 10-11, indicating demographic attributes of the audience as a whole (e.g., a percentage of audience members that are male or female, percentages of audience members in various age brackets, percentages of audience members in various income bracket, most common audience member cities/states of residence, etc.). The interface may also indicate social attributes of the audience as a whole (e.g., the most popular movies, sports teams, etc. amongst members of the audience). Audience profiles may also be segmented and/or aggregated with other audience profiles, as further described herein. Audience profiles may further be segmented based on advertisement, advertisement campaign, brand, content item, etc. Audience profiles may also be constructed by combining segments, as further described herein.

In a particular embodiment, the system 1400 may also receive event signals based on measurements (e.g., hardware measurements) made at a device. For example, an event signal from the tablet computing device 1414 or the mobile telephone device 1416 may include data associated with a hardware measurement at the tablet computing device 1414 or the mobile telephone device 1416, such as an accelerometer or gyroscope measurement indicating an orientation, a tilt, a movement direction, and/or a movement velocity of the tablet computing device 1414 or the mobile telephone device 1416. As another example, the system 1400 may receive a signal in response to an RFID device detecting that a user is visiting a particular physical location. The system 1400 of FIG. 14 may also link interactions with user profiles of users. This may provide information of "how many" viewers and "how long" the viewers watched a particular video (e.g., as in direct response measurement systems), and also "who" watched the particular video (e.g., demographic, social, and behavioral attributes of the viewers).

The system 1400 of FIG. 14 may thus enable audience measurement and analysis based on data (e.g., event signals) received from various sources. Further, the system 1400 of FIG. 14 may enable real-time or near-real time execution of queries on collected data, such as execution of "top N" queries using the bitmap index 1448.

FIG. 15 illustrates another particular embodiment of a system 1500 that is operable to generate and use a bitmap index. The system 1500 includes a data collection tier (e.g., subsystem) 1510, an event processing tier 1550, and a monitoring tier 1570. Components of the data collection tier 1510 are illustrated in further detail in FIG. 15B. Components of the event processing tier 1550 are illustrated in further detail in FIG. 15C. Components of the monitoring tier are illustrated in further detail in FIG. 15D.

The system 1500 includes (or has access to) an authentication provider 1532, third party data sources 1534, an audience web application 1546, a first framework 1544, a second framework 1542, a database 1548, an interrogator 1538, a data store 1536, and a bitmap index 1540. In an illustrative embodiment, the third party data sources 1534 are the third party data sources 1450 of FIG. 14, the event processing tier 1550 and the interrogator 1538 correspond to the data processing module 1444 of FIG. 14, and the bitmap index 1540 is the bitmap index 1448 of FIG. 14.

The data collection tier 1510 includes a content management system (CMS) 1512, cloud storage 1516, content delivery networks 1518, client browsers 1520, and client servers 1522. The data collection tier 1510 may further include an application programming interface (API) 1521. The API 1521 includes a load balancer 1524, capture servers 1526, and cloud storage 1530.

The event processing tier 1550 includes a job queues module 1551, an anonymous buffer 1560, and an event bundle buffer 1562. The job queues module 1551 includes an authentication token handler 1552, a backplane hander 1554, an event dispatch 1556, and an event bundle handler 1558. In alternate embodiments, the job queues module 1551 may include more, fewer, and/or different handlers than illustrated in FIG. 15.

The monitoring tier 1570 includes an internal monitoring module 1572, a ping monitor 1584, and a notifications module 1582. The internal monitoring module 1572 includes a penetration monitor 1574, a performance analysis module 1576, a system monitor 1578, and an alert rules module 1580.

During operation, the content management system 1512 may be used to generate a client specific script (e.g., webscript) 1514 for various clients (e.g., media properties). The client specific script 1514 may be stored in the cloud storage 1516 and replicated to the content delivery networks 1518. As audience members register and interact with a media property, the content delivery networks 1518 may deliver the client specific script 1514, along with property content, to the client browsers 1520. Based on the client specific script 1514, the client browsers 1520 may generate tags (e.g., a tag corresponding to a particular user activity, such as watching a video) or tokens (e.g., a social networking registration token). The tags or tokens may be sent to the load balancer 1524. The client servers 1522 may also generate tags or tokens to send to the load balancer 1524 based on user registrations and user activity at media properties. The tags or tokens from the client servers 1522 may be authenticated by the authentication provider 1532.

The load balancer 1524 may send the tags or tokens to the capture servers 1526 based on a load balancing algorithm. The capture servers 1526 may generate event data (e.g., event signals) based on the tags or tokens. The capture servers 1526 may store the event data in event logs 1528 in the cloud storage 1530 and send the event data to the job queues module 1551.

The job queues module 1551 may distribute the event data to different event handler(s) based on the type of the event data. For example, event data including an authentication token may be sent to the authentication token handler 1552. In addition, event data requiring additional information from social media sources may be sent to the backplane handler 1554. The handlers 1552-1554 may perform asynchronous event collection operations based on the received event data. For example, when a new user registers with a media property using a social networking profile, a token may be provided by the data collection tier to the authentication token handler 1552 and/or the backplane handler 1554. The handlers 1552-1554 may use the token to retrieve demographic and brand affinity data for the user from the user's social networking profile.

Event signals may also be sent to the event dispatch 1556, which determines whether the event signals corresponds to known or unknown users. When event data corresponds to an unknown user, the event dispatch 1556 buffers the event data in the anonymous buffer 1560. After a period of time (e.g., three days), event data from the anonymous buffer 1560 may be sent to the job queues module 1551 to be processed again.

When event data corresponds to a "known" user (e.g., a user that has already been assigned a user ID), the event dispatch 1556 may send the event data to the event bundles buffer 1562. The event bundle handler 1558 may retrieve event data stored in the event bundles buffer 1562 every bundling period (e.g., one hour). The event bundles processor 1558 may bundle event data received each bundling period into an event bundle that is sent to the interrogator 1538.

The interrogator 1538 may parse the event bundle and update the data store 1536, the SQL database 1548, and/or the bitmap index 1540. For example, the interrogator 1538 may perform bitmap index generation and update operations as described with reference to FIGS. 1-13. In a particular embodiment, the database 1548 corresponds to a profiles database that is accessible the first framework 1544 to the audience web application 1546. For example, the first framework 1544 may be a database-driven framework that is operable to dynamically generate webpages based on data in the database 1548. The audience web application may be operable to generate various graphical user interfaces (e.g., the GUI 1000 of FIGS. 10-11) to analyze the data collected by the system 1500. The bitmap index 1540 may be accessible to the audience web application 1546 via the second framework 1542. In one example, the second framework 1542 supports representational state transfer (REST)-based data access and webpage navigation. Although not shown, in particular embodiments, the data store 1536 may also be accessible to the audience web application 1546.

The monitoring tier 1570 may monitor the various components of the system 1500 during operation to detect errors, bottlenecks, network intrusions, and other issues. For example, the penetration monitor 1574 my collect data indicating unauthorized access to or from the capture servers 1526 and the first framework 1544. The penetration monitor 1574 may provide the data to the alert rules module 1580. Similarly, the system monitor 1578 may collect performance data from the capture servers 1526, from the second framework 1542, and from the data store 1536. The system monitor 1578 may provide the performance data to the performance analysis module 1576, which may analyze the data and send the analyzed data to the alert rules module 1580. The alert rules module 1580 may compare received data to alert rules and, based on the comparison send an alert to the notifications module 1582. For example, the alert rules module 1580 may determine that an intruder has accessed components of the system 1500 or that the system 1500 is not operating at a desired level of efficiency, and may send an alert to the notifications module 1582.

The notifications module 1582 may also receive alerts from the ping monitor 1584. The ping monitor 1584 may monitor the load balancer 1524 and the audience web application 1546 and collect data regarding uptime, downtime, and performance, and provide alerts to the notification module 1582.

The notification module 1582 may send notifications (e.g., via short message service (SMS), e-mail, instant messaging, paging, etc.) to one or more technical support staff members 1564 to enable timely response in the event of errors, performance bottlenecks, network intrusion, etc.

In accordance with various embodiments of the present disclosure, the methods, functions, and modules described herein may be implemented by software programs executable by a computer system. Further, in an exemplary embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, a set-top box, a media player, or any combination thereof. The computer system may be connected, e.g., using a network, to other computer systems or peripheral devices. For example, the computer system or components thereof can include or be included within any one or more devices, modules, and/or components illustrated in FIGS. 1-15. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

In accordance with at last one described embodiment, a method includes receiving an event signal at a computing device including a processor. The method also includes determining an identifier associated with the event signal and storing the event signal in a data store. The method further includes modifying a value of at least one bit stored in a bitmap index based on the identifier. The bitmap index includes a plurality of bit strings and a particular location in each of the plurality of bit strings corresponds to the identifier.

In another particular embodiment, a method includes receiving a first signal at a computing device comprising a processor, where the first signal includes information corresponding to a first user identifier associated with a first user. The method also includes modifying a value of a first bit of a bitmap index responsive to the first signal, where the bitmap index includes a plurality of bit strings, where a value stored in a particular location in each of the bit strings indicates whether a corresponding signal associated with a corresponding user identifier has been received, and where the first bit is stored in a first location of the bitmap index that corresponds to the first user identifier and to the first signal. The method further includes receiving a second signal that includes second information corresponding to a second user identifier associated with a second user. The method includes modifying a value of a second bit of the bitmap index responsive to the second signal, where the second bit is stored in a second location of the bitmap index that corresponds to the second user identifier and to the second signal. The method also includes receiving a query directed to the bitmap index and outputting a result of the query based on executing a query execution plan for the query, where executing the query execution includes performing one or more set operations with respect to the first bit and the second bit.

In another particular embodiment, a system includes a processor and a memory storing instructions executable by the processor to perform operations including receiving a first signal, where the first signal includes information corresponding to a first user identifier associated with a first user. The operations also include modifying a value of a first bit of a bitmap index responsive to the first signal, where the bitmap index includes a plurality of bit strings, where a value stored in a particular location in each of the bit strings indicates whether a corresponding signal associated with a corresponding user identifier has been received, and where the first bit is stored in a first location of the bitmap index that corresponds to the first user identifier and to the first signal. The operations further include receiving a second signal that includes second information corresponding to a second user identifier associated with a second user. The operations include modifying a value of a second bit of the bitmap index responsive to the second signal, where the second bit is stored in a second location of the bitmap index that corresponds to the second user identifier and to the second signal.

In another particular embodiment, a computer-readable storage device stores instructions that, when executed, cause a computer to perform operations including receiving a first signal at a computing device comprising a processor, where the first signal includes information corresponding to a first user identifier associated with a first user. The operations also include modifying a value of a first bit of a bitmap index responsive to the first signal, where the bitmap index includes a plurality of bit strings, where a value stored in a particular location in each of the bit strings indicates whether a corresponding signal associated with a corresponding user identifier has been received, and where the first bit is stored in a first location of the bitmap index that corresponds to the first user identifier and to the first signal. The operations further include receiving a second signal that includes second information corresponding to a second user identifier associated with a second user. The operations include modifying a value of a second bit of the bitmap index responsive to the second signal, where the second bit is stored in a second location of the bitmap index that corresponds to the second user identifier and to the second signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a first signal at a computing device comprising a processor, wherein the first signal includes information corresponding to a first user identifier associated with a first user;
   modifying a value of a first bit of a bitmap index responsive to the first signal, wherein the bitmap index includes a plurality of bit strings, wherein a value stored in a particular location in each of the bit strings indicates whether a corresponding signal associated with a corresponding user identifier has been received, and wherein the first bit is stored in a first location of the bitmap index that corresponds to the first user identifier and to the first signal;
   receiving a second signal that includes second information corresponding to a second user identifier associated with a second user;

modifying a value of a second bit of the bitmap index responsive to the second signal, wherein the second bit is stored in a second location of the bitmap index that corresponds to the second user identifier and to the second signal;

receiving a query directed to the bitmap index; and outputting a result of the query based on executing a query execution plan for the query, wherein executing the query execution plan comprises performing one or more set operations with respect to the first bit and the second bit.

2. The method of claim 1, wherein the first location is in a first column of the bitmap index that corresponds to the first user identifier and in a first row of the bitmap index that corresponds to the first signal.

3. The method of claim 1, wherein the query execution plan identifies:
the one or more set operations;
that one or more first nodes are to send stored portions of one or more bit strings to a second node;
that the second node is to perform the one or more set operations with respect to:
the portions of the one or more bit strings received from the one or more first nodes; and
portions of one or more bit strings stored at the second node; and
that the second node is to concatenate results of performing the one or more set operations to generate a result bit string that indicates a result of the query.

4. The method of claim 1, wherein the first user identifier is assigned to the first user based on a registration event.

5. The method of claim 4, wherein the registration event indicates demographic information of the first user based on social network data.

6. The method of claim 1, wherein one or more of the plurality of bit strings corresponds to a demographic attribute, a behavior, a brand affinity, or a combination thereof.

7. The method of claim 1, further comprising determining a top Z signals for a subset of users based on the bitmap index, wherein Z is a positive integer.

8. The method of claim 7, wherein determining the top Z signals comprises:
generating a filter string corresponding to the subset of users;
performing intersection operations of the filter string to generate a plurality of result strings; and
identifying the top Z signals for the subset of users based on the result strings.

9. The method of claim 8, wherein generating the filter string includes performing one or more logical operations.

10. The method of claim 1, wherein a first portion of a first bit string is stored at a first particular node and a second portion of the first bit string is stored at a second particular node that is different from the first particular node.

11. The method of claim 1, wherein each of the plurality of bit strings is stored as one or more distributed slices.

12. The method of claim 11, wherein:
each of the distributed slices comprises one or more chunks; and
a particular chunk is stored in a compressed form if each bit of the particular chunk has a particular value.

13. The method of claim 1, wherein data corresponding to each row of the bitmap index is stored in a data store.

14. The method of claim 1, wherein data corresponding to at least one signal is stored in a data store but not in the bitmap index.

15. The method of claim 1, wherein the bitmap index is associated with at least one of advertising data, customer data, inventory data, sensor data, healthcare data, or financial data.

16. A system comprising:
a processor; and
a memory storing instructions executable by the processor to perform operations comprising:
receiving a first signal, wherein the first signal includes information corresponding to a first user identifier associated with a first user;
modifying a value of a first bit of a bitmap index responsive to the first signal, wherein the bitmap index includes a plurality of bit strings, wherein a value stored in a particular location in each of the bit strings indicates whether a corresponding signal associated with a corresponding user identifier has been received, and wherein the first bit is stored in a first location of the bitmap index that corresponds to the first user identifier and to the first signal;
receiving a second signal that includes second information corresponding to a second user identifier associated with a second user; and
modifying a value of a second bit of the bitmap index responsive to the second signal, wherein the second bit is stored in a second location of the bitmap index that corresponds to the second user identifier and to the second signal.

17. The system of claim 16, wherein the bitmap index is associated with at least one of advertising data, customer data, inventory data, sensor data, healthcare data, or financial data.

18. The system of claim 16, wherein one or more of the plurality of bit strings corresponds to a demographic attribute, a behavior, a brand affinity, or a combination thereof.

19. A non-transitory computer readable storage device stores instructions that, when executed, cause a computer to perform operations comprising:
receiving a first signal at a computing device comprising a processor, wherein the first signal includes information corresponding to a first user identifier associated with a first user;
modifying a value of a first bit of a bitmap index responsive to the first signal, wherein the bitmap index includes a plurality of bit strings, wherein a value stored in a particular location in each of the bit strings indicates whether a corresponding signal associated with a corresponding user identifier has been received, and wherein the first bit is stored in a first location of the bitmap index that corresponds to the first user identifier and to the first signal;
receiving a second signal that includes second information corresponding to a second user identifier associated with a second user; and
modifying a value of a second bit of the bitmap index responsive to the second signal, wherein the second bit is stored in a second location of the bitmap index that corresponds to the second user identifier and to the second signal.

20. The non-transitory computer readable storage device of claim 19, wherein the bitmap index is associated with at least one of advertising data, customer data, inventory data, sensor data, healthcare data, or financial data.

* * * * *